US012539201B2

(12) United States Patent
Yang

(10) Patent No.: US 12,539,201 B2
(45) Date of Patent: Feb. 3, 2026

(54) ENDODONTIC HANDPIECE SYSTEMS AND METHODS

(71) Applicant: Innovative BioCeramix Inc., Burnaby (CA)

(72) Inventor: Quanzu Yang, Burnaby (CA)

(73) Assignee: Innovative BioCeramix Inc., Burnaby (CA)

( * ) Notice: Subject to any disclaimer, the term of this patent is extended or adjusted under 35 U.S.C. 154(b) by 107 days.

(21) Appl. No.: 17/240,833

(22) Filed: Apr. 26, 2021

(65) Prior Publication Data

US 2021/0330425 A1 Oct. 28, 2021

Related U.S. Application Data

(60) Provisional application No. 63/102,229, filed on Jun. 3, 2020, provisional application No. 63/101,333, filed on Apr. 27, 2020.

(51) Int. Cl.
*A61C 5/42* (2017.01)
*A61C 1/00* (2006.01)
*A61C 1/07* (2006.01)

(52) U.S. Cl.
CPC ............. *A61C 5/42* (2017.02); *A61C 1/003* (2013.01); *A61C 1/0061* (2013.01); *A61C 1/07* (2013.01)

(58) Field of Classification Search
CPC ........... A61C 5/42; A61C 1/0061; A61C 1/07; A61C 17/02; A61C 1/06; A61C 1/141; A61C 1/12; A61C 1/10; A61C 1/14; A61C 1/003
See application file for complete search history.

(56) References Cited

U.S. PATENT DOCUMENTS 3,762,052 A * 10/1973 Melde .................... A61C 1/055
433/165
3,871,097 A * 3/1975 Melde .................... A61C 1/141
433/129

(Continued)

FOREIGN PATENT DOCUMENTS

CN 107616849 A 1/2018
CN 110394469 A * 11/2019

(Continued)

*Primary Examiner* — Heidi M Eide
*Assistant Examiner* — Lina Faraj
(74) *Attorney, Agent, or Firm* — Schacht Law Office, Inc.; Michael R. Schacht

(57) ABSTRACT

An endodontic handpiece comprises a handle assembly and an endodontic tool. The handle assembly comprises a handle housing, a chuck assembly, a bearing system for supporting the chuck assembly for rotation relative to the handle housing, a first drive system for rotating the chuck assembly, and first and second drive systems. The endodontic tool defines a support portion and a working portion. The chuck assembly transfers movement of the chuck assembly to the endodontic tool. The endodontic handpiece operates in at least one of first, second, and third modes in which the first drive system causes rotation of the endodontic tool through the chuck assembly, the second drive system causes vibration of the endodontic tool, and/or the first drive system causes rotation of the endodontic tool through the chuck assembly.

14 Claims, 12 Drawing Sheets

(56) References Cited

U.S. PATENT DOCUMENTS

| | | | | |
|---|---|---|---|---|
| 4,484,891 A | * | 11/1984 | Nash | A61C 1/148 433/116 |
| 4,681,545 A | * | 7/1987 | Lapcevic | A61C 5/50 433/224 |
| 5,022,857 A | * | 6/1991 | Matsutani | A61C 3/02 433/85 |
| 5,069,620 A | * | 12/1991 | Matsutani | B23Q 11/10 433/84 |
| 5,275,558 A | * | 1/1994 | Seney | A61C 1/055 433/84 |
| 5,924,864 A | * | 7/1999 | Loge | A61B 17/1622 433/118 |
| 6,030,216 A | * | 2/2000 | Rosenstatter | A61C 1/07 122/118 |
| 6,106,290 A | * | 8/2000 | Weissman | A61C 1/148 433/118 |
| 6,171,108 B1 | * | 1/2001 | Roane | A61C 1/141 433/102 |
| 6,443,731 B2 | * | 9/2002 | Kuhn | A61C 1/185 433/118 |
| 6,702,578 B2 | * | 3/2004 | Matsutani | A61C 1/082 433/102 |
| 6,716,028 B2 | * | 4/2004 | Rahman | A61C 1/07 433/119 |
| 6,821,119 B2 | * | 11/2004 | Shortt | A61C 17/40 433/118 |
| 6,899,715 B1 | * | 5/2005 | Beaty | A61B 17/1604 606/92 |
| 8,021,152 B2 | * | 9/2011 | Mizunuma | A61C 1/12 433/126 |
| 8,435,034 B2 | * | 5/2013 | Gersh | A61C 17/20 433/119 |
| 8,853,895 B2 | * | 10/2014 | Duesing | A61C 1/088 310/90 |
| 9,895,204 B2 | * | 2/2018 | Kimura | A61C 1/055 |
| 2003/0190583 A1 | * | 10/2003 | Kuhn | F16F 15/08 433/132 |
| 2005/0021065 A1 | * | 1/2005 | Yamada | A61B 17/32002 606/169 |
| 2005/0032017 A1 | * | 2/2005 | Levy | A61C 1/088 433/119 |
| 2006/0257818 A1 | * | 11/2006 | McPherson | A61C 19/041 433/102 |
| 2006/0257819 A1 | * | 11/2006 | Johnson | A61C 1/07 433/86 |
| 2007/0015108 A1 | * | 1/2007 | Ruddle | A61C 5/40 433/122 |
| 2007/0087306 A1 | * | 4/2007 | Cohen | B23B 31/201 433/129 |
| 2008/0318185 A1 | * | 12/2008 | Mizunuma | A61C 1/12 433/132 |
| 2009/0004622 A1 | * | 1/2009 | Kuhn | A61C 1/06 433/131 |
| 2009/0042163 A1 | * | 2/2009 | Johnson | A61C 17/20 433/86 |
| 2009/0130622 A1 | * | 5/2009 | Bollinger | A61C 1/0046 433/29 |
| 2009/0136896 A1 | * | 5/2009 | Meyer Shuster | A61C 5/40 433/102 |
| 2009/0176188 A1 | * | 7/2009 | Tobis | A61C 3/02 433/102 |
| 2009/0274992 A1 | * | 11/2009 | Kim | A61C 1/10 433/132 |
| 2010/0233651 A1 | * | 9/2010 | Kuhn | F16C 35/077 310/90 |
| 2010/0248177 A1 | * | 9/2010 | Mangelberger | A61C 1/12 307/104 |
| 2010/0261140 A1 | * | 10/2010 | Klee | H02K 5/128 433/131 |
| 2010/0330528 A1 | * | 12/2010 | Hof | A61C 1/185 433/105 |
| 2012/0040306 A1 | * | 2/2012 | Johnson | A61C 5/40 433/81 |
| 2012/0111590 A1 | * | 5/2012 | Rothenwaender | F15B 11/08 173/15 |
| 2015/0164614 A1 | * | 6/2015 | Shotton | A61C 5/42 433/102 |
| 2015/0320522 A1 | * | 11/2015 | Eder | A61B 17/1673 433/173 |
| 2016/0067011 A1 | * | 3/2016 | Rothenwaender | A61B 17/1631 606/1 |
| 2016/0143705 A1 | * | 5/2016 | Clark | A61C 5/40 433/102 |
| 2016/0270876 A1 | * | 9/2016 | Fisher | A61C 1/0015 |
| 2017/0035529 A1 | * | 2/2017 | Eder | A61C 1/07 |
| 2017/0042639 A1 | * | 2/2017 | Tanaka | A61C 1/12 |
| 2017/0265961 A1 | * | 9/2017 | Kato | A61C 3/02 |
| 2017/0348068 A1 | * | 12/2017 | Levy | A61C 1/07 |
| 2018/0049843 A1 | * | 2/2018 | Shotton | A61C 1/003 |
| 2018/0049845 A1 | | 2/2018 | McSpadden | |
| 2018/0145576 A1 | * | 5/2018 | Kraus | A61C 17/3481 |
| 2018/0177575 A1 | * | 6/2018 | Yoshida | A61B 5/4547 |
| 2019/0159867 A1 | * | 5/2019 | Bruder | A61B 1/0615 |
| 2019/0290397 A1 | * | 9/2019 | Bruder, III | A61C 17/024 |
| 2022/0354616 A1 | * | 11/2022 | Young | A61B 90/98 |

FOREIGN PATENT DOCUMENTS

| | | | | |
|---|---|---|---|---|
| CN | 112168384 A | * | 1/2021 | A61C 5/40 |
| DE | 102006007316 A1 | * | 8/2007 | A61C 5/42 |
| DE | 102007015217 A1 | * | 6/2008 | A61C 1/02 |
| DE | 102015114553 A1 | | 3/2017 | |
| EP | 2123233 A1 | * | 11/2009 | A61C 1/14 |
| KR | 20090110754 A | * | 10/2009 | A61C 1/0069 |

* cited by examiner

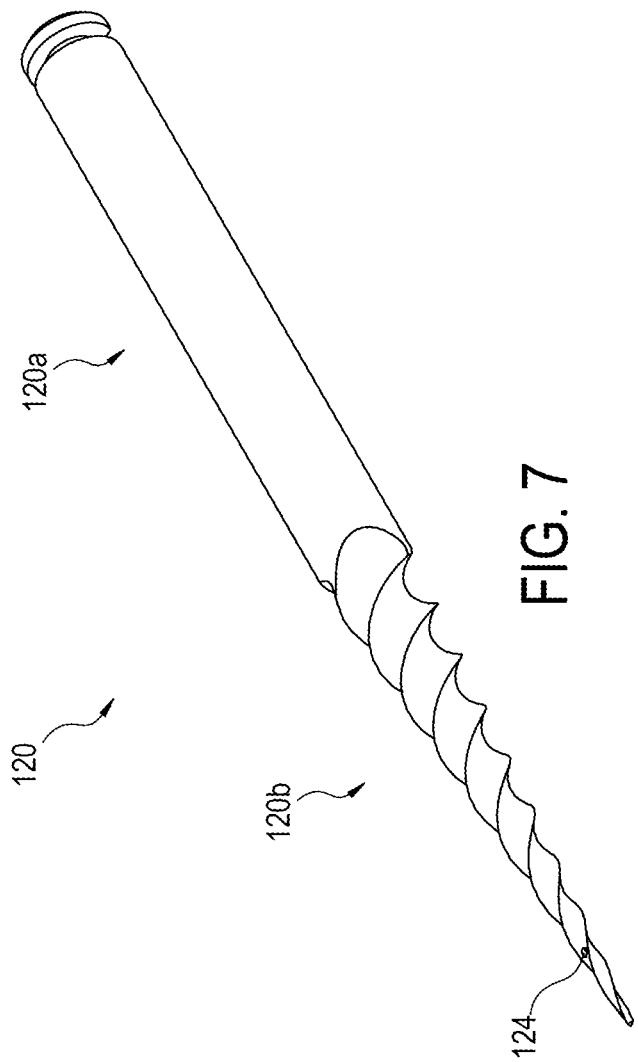
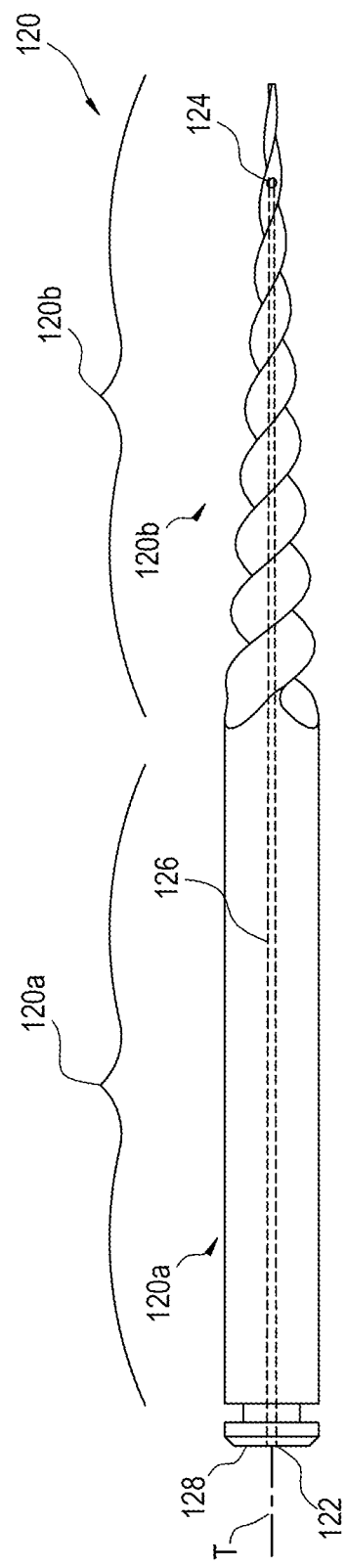
FIG. 7
FIG. 8

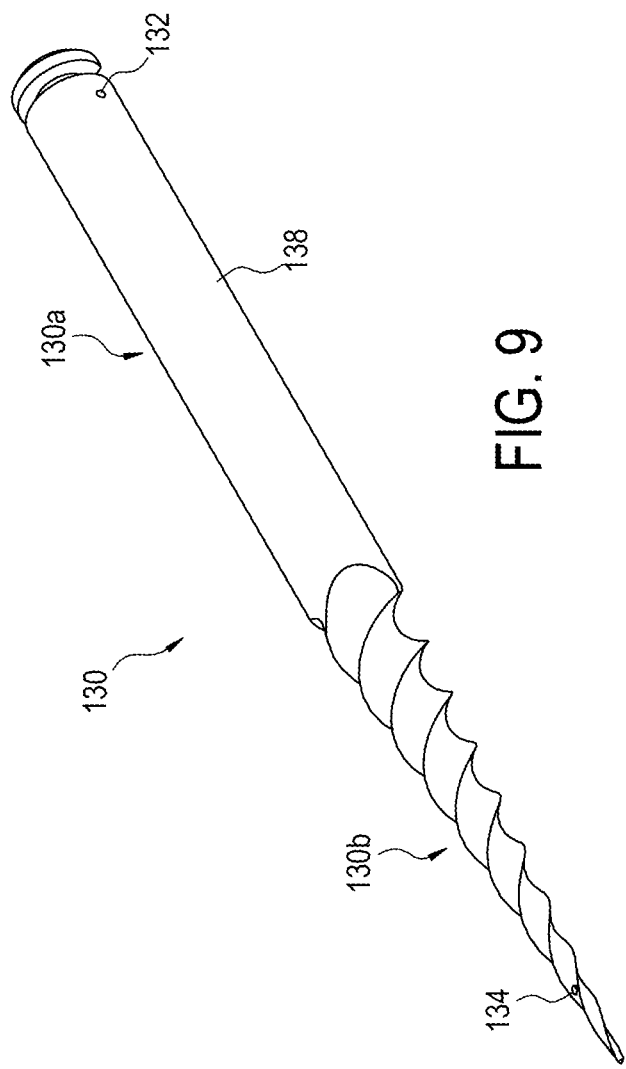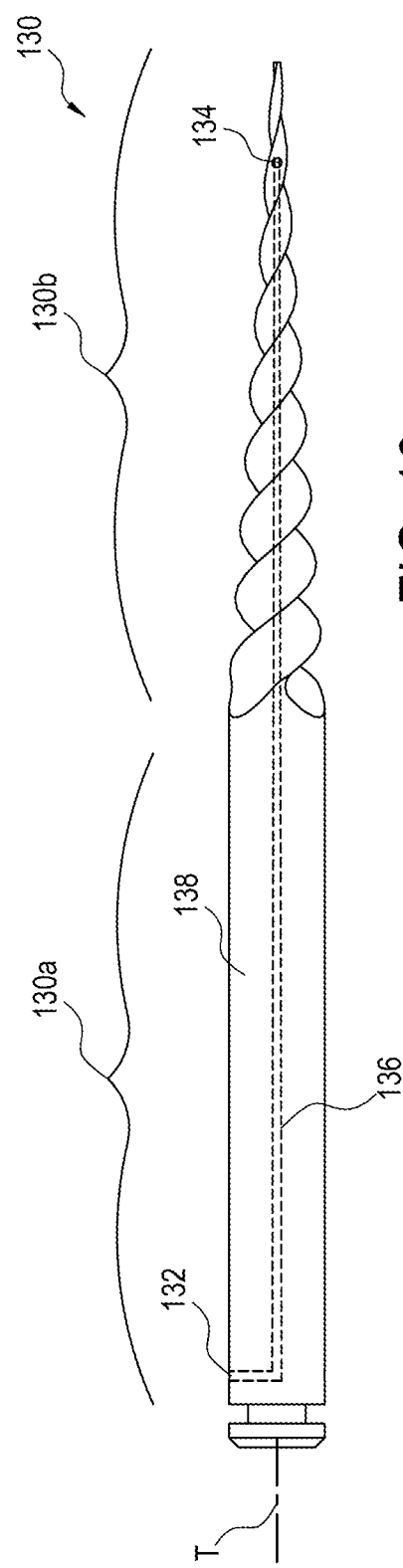

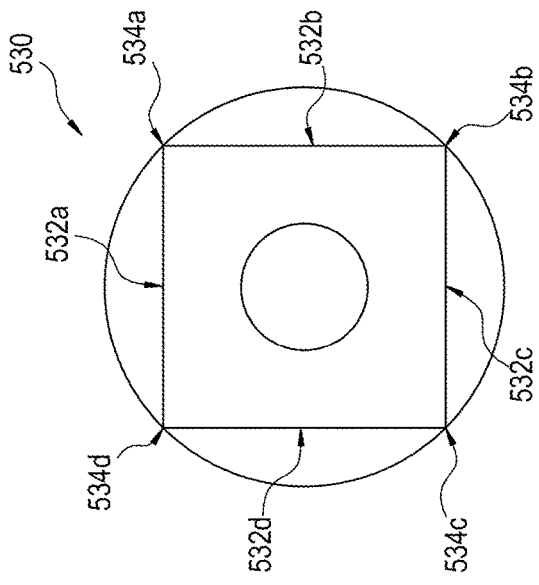
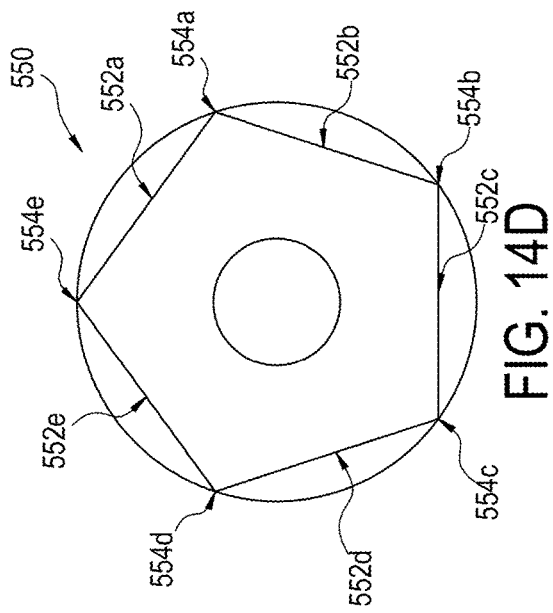
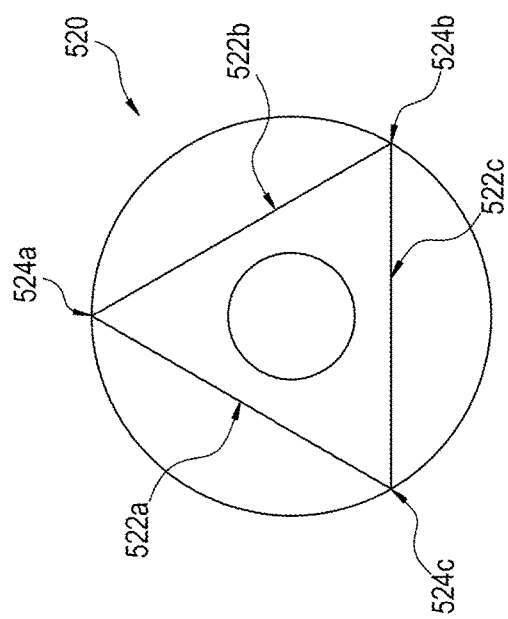
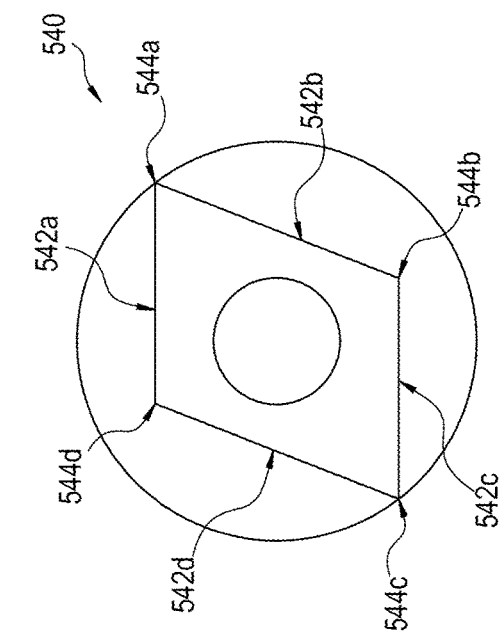
FIG. 14A
FIG. 14B
FIG. 14C
FIG. 14D

ENDODONTIC HANDPIECE SYSTEMS AND METHODS

RELATED APPLICATIONS

This application, U.S. patent application Ser. No. 17/240,833 filed Apr. 26, 2021, claims benefit of U.S. Provisional Application Ser. No. 63/101,333 filed Apr. 27, 2020.

This application (Attorney's Ref. No. P220039) also claims benefit of U.S. Provisional Application Ser. No. 63/102,229 filed Jun. 3, 2020.

The contents of all related applications are incorporated herein by reference.

TECHNICAL FIELD

The present invention relates to endodontic handpiece systems and methods and, in particular, to endodontic handpiece systems and methods that rotate a drill bit configured for use during root canal therapy.

BACKGROUND

Endodontic handpieces typically comprise a handle assembly and a tool (e.g., drill, file, or reamer) rotatably supported by the handle assembly and are available in a variety of sizes, styles, and configurations. The handle assembly typically comprises a motor configure to rotate the first example tool about a longitudinal axis. The handle assembly may be cordless, and a cordless handle assembly typically comprises an electric motor and battery for supplying power to the electric motor. The handle assembly may, alternatively, be corded, in which case the motor may be powered by electricity or pressurized fluid (e.g., hydraulic or pneumatic) from a remote source through a cable or conduit.

The present invention relates to improved handle assemblies and drill bits used during root canal therapy, and that application of the present invention will be described herein. Endodontic root canal treatment (also known as endodontic therapy, or root canal therapy) is a procedure for the infected pulp of a tooth which results in the elimination of infection and the protection of the decontaminated tooth from future microbial invasion. Endodontic treatment includes the removal of these structures, the subsequent shaping, cleaning, and decontamination of the resulting hollows with small files and/or irrigating solutions, and the obturation (filling) of the decontaminated canals. Removing the infected/inflamed pulpal tissue enables the endodontist to help preserve the longevity and function of the tooth.

A rotary handpiece is normally used for the removal of the infected dentin as accomplished by use of a small cylindrical file, usually rotated within the canal manually.

Shaping of the root canal is a difficult task, even for a skilled dentist, because the root canal has various degrees of spatial curvatures. When shaping in these areas, it is particularly important to prevent breakage of the files within the canal, creating deviations or uneven/unequal canal wall preparations, or ledging the canal curvature. Furthermore, improper filing can lead to over preparation of the outside canal wall with under preparation of the inside canal wall in the three-dimensional canal.

SUMMARY

The present invention may be embodied as an endodontic handpiece comprising a handle assembly and an orthodontic too. The handle assembly comprises a handle housing, a chuck assembly, a bearing system for supporting the chuck assembly for rotation relative to the handle housing, a first drive system for rotating the chuck assembly, and a second drive system for imparting a vibratory force to the chuck assembly. The endodontic tool defines a support portion and a working portion. The chuck assembly engages the support portion of the endodontic tool such that movement of the chuck assembly is transferred to the endodontic tool. The endodontic handpiece operates in at least a first mode, a second mode, and a third mode. In the first mode, the first drive system causes rotation of the endodontic tool through the chuck assembly. In the second mode, the second drive system causes vibration of the endodontic tool. In the third mode, the first drive system causes rotation of the endodontic tool through the chuck assembly and the second drive system causes vibration of the endodontic tool.

The present invention may also be embodied as an endodontic handpiece comprising a handle assembly and an endodontic too. The handle assembly defines a housing chamber and comprising a handle housing, a chuck assembly, a bearing system for supporting the chuck assembly for rotation relative to the handle housing, and at least one drive system. The endodontic tool defines a support portion, a working portion, a tool tip, a tool inlet, a tool outlet located adjacent to or at the tool tip, and a tool passageway extending between the tool inlet and the tool outlet. The chuck assembly engages the support portion of the endodontic tool such that movement of the chuck assembly is transferred to the endodontic tool and the tool inlet is located within the handle chamber. The endodontic handpiece operates in at least a first mode in which the at least one drive system causes movement of the endodontic tool through the chuck assembly, a second mode in which fluid flows through the tool passageway, and a third mode in which the first drive system causes rotation of the endodontic tool through the chuck assembly fluid flows through the tool passageway.

The present invention may be embodied as a method of performing an endodontic procedure comprising the following steps. A handle assembly is provided, the handle assembly comprising a handle housing, a chuck assembly, a bearing system for supporting the chuck assembly for rotation relative to the handle housing, a first drive system for rotating the chuck assembly, and a second drive system for imparting a vibratory force to the chuck assembly. An endodontic tool defining a support portion and a working portion is provided. An endodontic handpiece is formed by engaging the chuck assembly with the support portion of the endodontic tool such that movement of the chuck assembly is transferred to the endodontic tool. The endodontic handpiece is operated in at least a first mode in which the first drive system causes rotation of the endodontic tool through the chuck assembly, a second mode in which the second drive system causes vibration of the endodontic tool, and a third mode in which the first drive system causes rotation of the endodontic tool through the chuck assembly and the second drive system causes vibration of the endodontic tool.

BRIEF DESCRIPTION OF THE DRAWINGS

FIG. 7 is a perspective view of a second example tool of the present invention;

FIG. 8 is a side elevation view of the second example tool;

FIG. 9 is a perspective view of a third example tool of the present invention;

FIG. 10 is a side elevation view of the third example tool;

FIGS. 14A-14H are end section views illustrating example cross-sectional configurations that may be implemented by any of the first through third example tools described above.

DETAILED DESCRIPTION

Figure 1:
FIG. 1 is a side elevation view of a first example handpiece of the present invention.

The present invention may take a number of different forms, and several different example endodontic handpieces comprising different handle assemblies and different tools will be described below.

I. First Example Endodontic Handpiece

Referring initially to FIGS. 1-5 of the drawing, depicted at 20 therein is a first example handpiece 20 constructed in accordance with, and embodying, the principles of the present invention. The example handpiece 20 comprises a first example handle assembly 22 and a first example tool 24. The first example handle assembly 22 supports the first example tool 24 for simultaneous axial rotation and vibration while also allowing pressurized fluid to flow out of the first example tool 24 at or near a tip 26 of the first example tool 24 as the first example tool 24 is rotated and vibrated.

Figure 2:
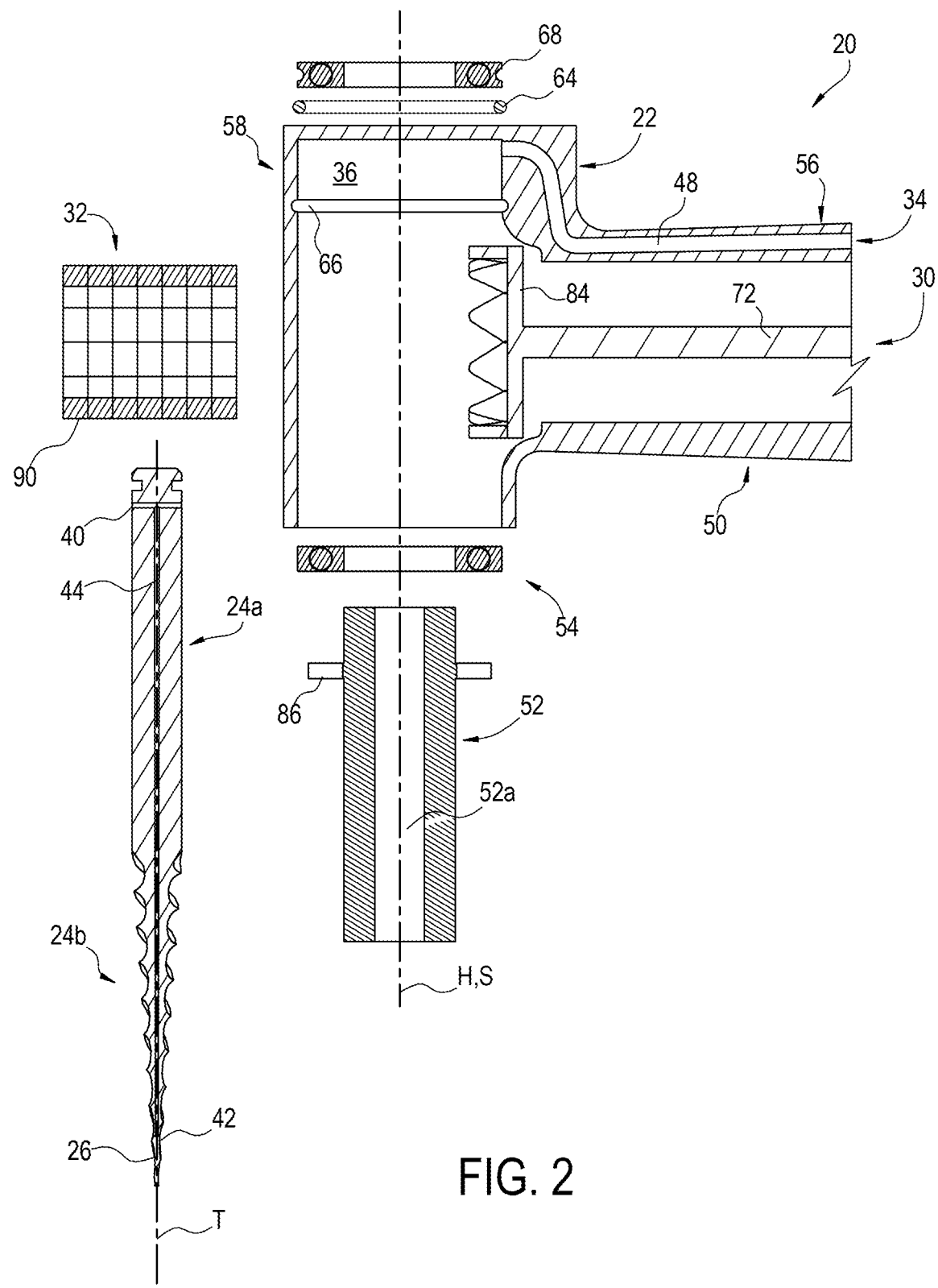
FIG. 2 is an exploded, side elevation, section view illustrating a first example tool, a portion of a first example handle assembly of the first example handpiece, a portion of a first example first system, and an example second drive system.
Figure 3:
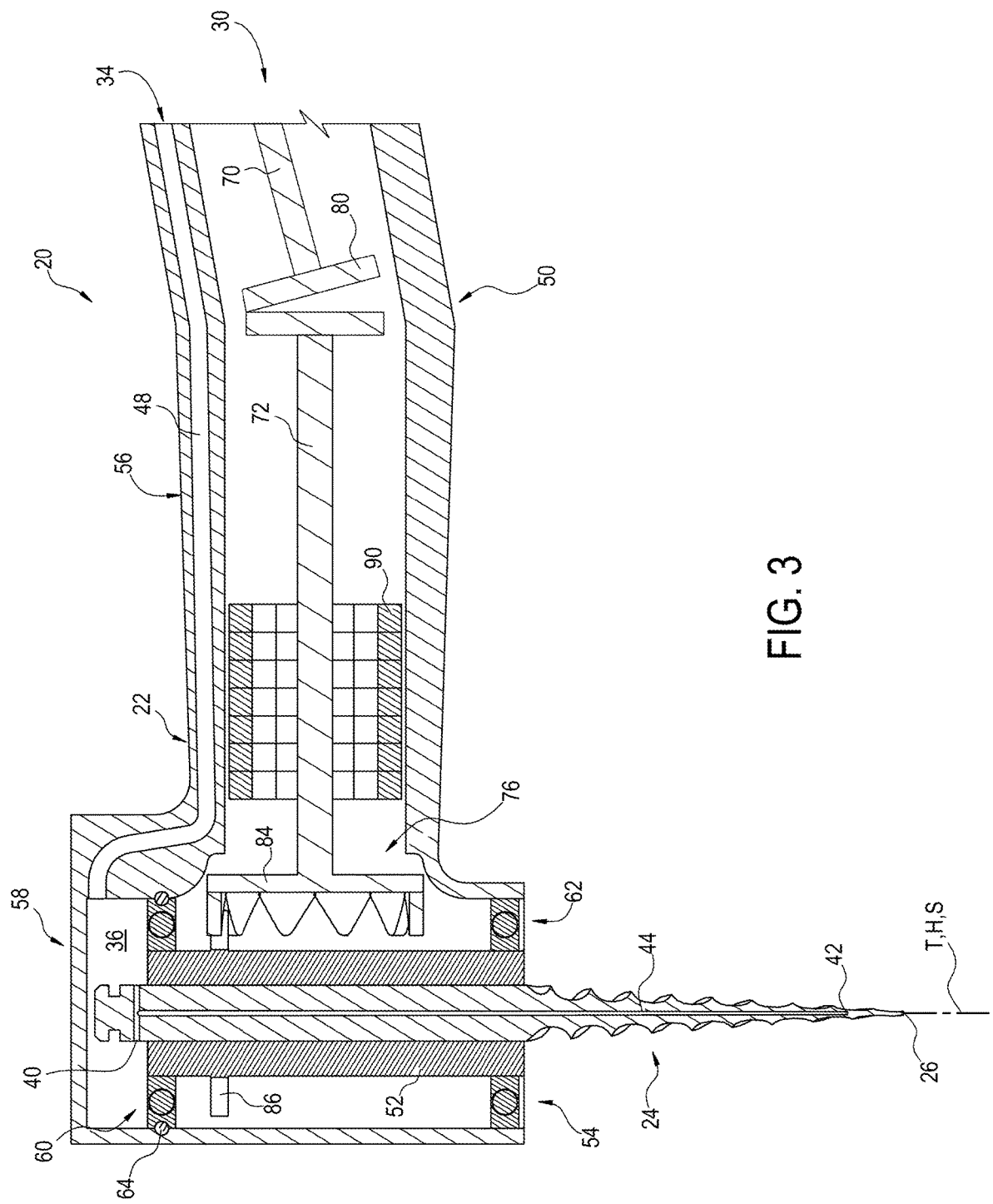
FIG. 3 is an assembled, side elevation, section view illustrating the first example tool, a portion of the first example handle assembly of the first example handpiece, and the example first and second drive systems.
Figure 4:
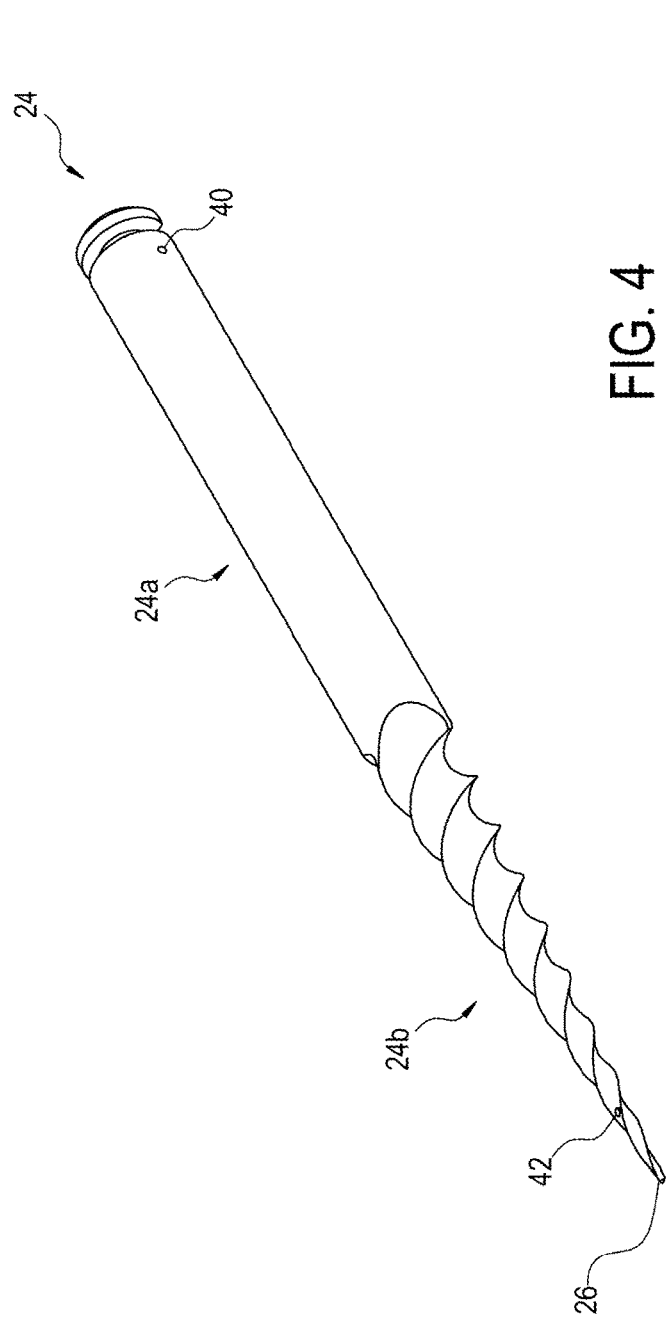
FIG. 4 is a perspective view of the first example tool.

In particular, FIG. 2 illustrates that the first example tool 24 defines a tool axis T, and arrow R in FIG. 3 illustrates that the first example handle assembly 22 supports the first example tool 24 for axial rotation about the example tool axis T. FIGS. 2 and 3 illustrate that the first example handle assembly 22 further comprises a first drive system 30 for rotating the first example tool 24 about the example tool axis T and a second drive system 32 for generating a vibratory force that may cause vibration of the first example tool 24. FIGS. 2 and 3 further illustrate that the first example handle assembly 22 further comprises a fluid conduit system 34 that allows flow of pressurized fluid (not shown) to an example handle chamber 36 (FIG. 3) defined by the handle assembly 22.

Figure 5:
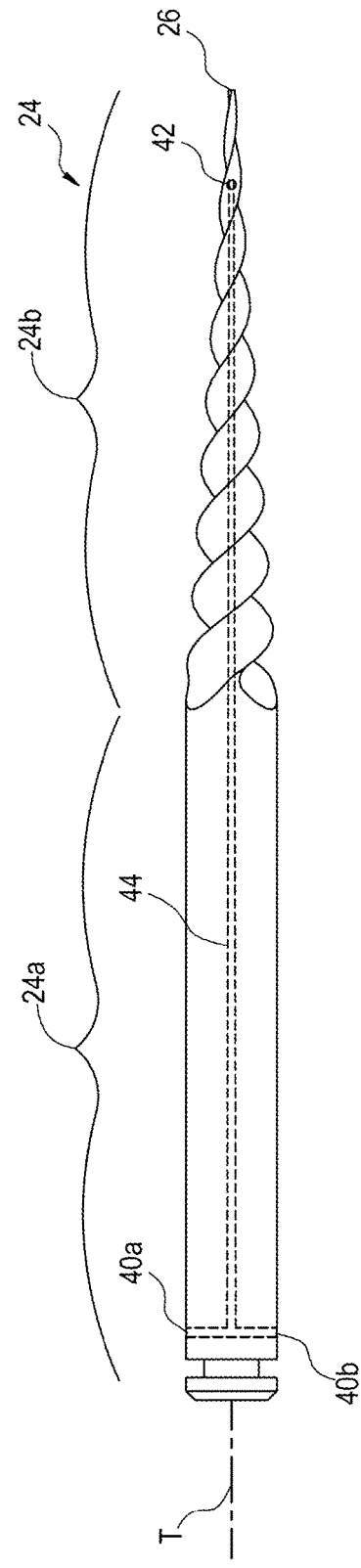
FIG. 5 is a side elevation view of the first example tool.

FIGS. 2-5 illustrate that the first example tool 24 is a tapered drill bit defining a tool inlet 40 and a tool outlet 42. FIGS. 2, 3, and 5 further illustrate the first example tool 24 defines a tool passageway 44 extending between the first example tool inlet 40 and the first example tool outlet 42. FIG. 3 illustrates that, when the first example tool 24 is supported by the first example handle assembly 22, the first example tool inlet 40 is arranged within the example handle chamber 36. Pressurized fluid within the example handle chamber 36 thus may flow into the first example tool inlet 42, through the first example tool passageway 44, and out of the first example tool outlet 42. The example tool 24 may define any of the tool cross-sections described below.

FIG. 1 further illustrates that the first example handle assembly 22 comprises a cord assembly 46 that operatively connects first example handle assembly 22 to at least one source of energy (not shown). As is known, the cord assembly 46 may comprise a conduit (not shown) connected at least a source of pressurized fluid such as water, air, or a cleaning solution. The conduit contained by the cord assembly 46 is operatively connected to a handle conduit 48 (FIGS. 2 and 3) supported within or formed by the handle assembly 22 to allow the pressurized fluid to flow from the remote source to the handle chamber 36 and thus into the example tool inlet 42.

With the foregoing general understanding of the principles of the present invention in mind, the construction and operation of the first example handpiece 20 will now be described in further detail.

FIGS. 1-3 illustrate that the handle assembly 22 further comprises handle housing 50, a chuck assembly 52, and a bearing system 54. The example handle housing 50 defines a handle portion 56 and a head portion 58. The user grasps the handle portion 56, and the head portion 58 is typically configured to extend at an angle relative to the handle portion 56 appropriate for a particular endodontic task to be performed.

The example chuck assembly 52 is or may be conventional and will be described herein only to that extent helpful for a complete understanding of the present invention. The example chuck assembly 52 is configured to be supported by the bearing system 54 for axial rotation about a chuck axis S as described below. The chuck assembly 52 engages endodontic tools such as the example tool 24 such that axial rotation of the chuck assembly 52 about the chuck axis S causes axial rotation of the tool about a tool axis T. The bearing system 54 may further be a sealed chuck assembly 52 that inhibits flow of fluid between the chuck assembly 52 and the tool 24.

The example bearing system 54 is a sealed bearing system comprises a first bearing assembly 60, a second bearing assembly 62, a seal ring 64, a first seal recess 66 formed in the head portion 58 of the handle housing 50, and a second seal recess 68 formed in the first bearing assembly 60. When the handle assembly 22 is assembled as shown in FIG. 3, head portion 58 of the handle housing 50 supports the first and second bearing assemblies 60 and 62 to define a handle axis H and such that the seal ring 64 is arranged at least partly within the first and second seal recesses 66 and 68. So arranged, the example seal ring 64 prevents fluid flow out of the handle chamber 36 between the handle housing 50 and the first bearing assembly 60. The first and second bearing assemblies 60 and 62 further support the chuck assembly 52 such that a longitudinal axis S of the chuck assembly 52 and the handle axis H are substantially aligned and such that the chuck assembly 52 is supported for axial rotation about the handle axis H. Bearing systems other than the example bearing system 54 may be used to support the chuck assembly 52 relative to the handle housing 50.

The chuck assembly 52 and the bearing system 54 effectively, or at least partly, seal the handle chamber 36 such that, when the tool 24 is supported by the chuck assembly 52, fluid can flow into and out of the handle chamber only through the fluid conduit system 34 and through the tool passageway 44. Introduction of pressurized fluid into the handle chamber 36 through the fluid conduit system 34 thus causes pressurized fluid to flow into the tool inlet 40, through the tool passageway 44, and out of the tool inlet 40 at a location adjacent to or at the tool tip 26. Further, introduction of a partial vacuum within the handle chamber 36 through the fluid conduit system 34 causes fluid to flow into the tool outlet 42 at a location adjacent to or at the tool tip 26, through the tool passageway 44, out of the tool inlet 40, into the handle chamber 36, and out of the handle assembly 22 through the fluid conduit system 34.

FIGS. 2 and 3 further illustrate that the example first drive system 30 comprises a first drive shaft 70, a second drive shaft 72, a handle coupler system 74, and a head coupler system 76. The example handle coupler system 74 comprises a first handle gear 80 and a second handle gear 82, while the example head coupler system 76 comprise a first head gear 84 and a second head gear 86. The first handle gear 80 is supported by the first drive shaft 70, while the second handle gear 82 and the first head gear 84 are supported by the second drive shaft 72. The second head gear 86 is supported by the chuck assembly 52. The first drive shaft 70 is connected to a motor (not shown) such that the first drive system 30 transfers rotational output of the motor to axial rotation of the chuck assembly 52 about the chuck axis S as generally discussed above. Drive systems other than the example drive system 30 may be used to cause axial rotation of the chuck assembly 52. The example first drive system 30 further comprises controls (not shown) such as switches and the like to control and operation of the motor.

Figure 6:
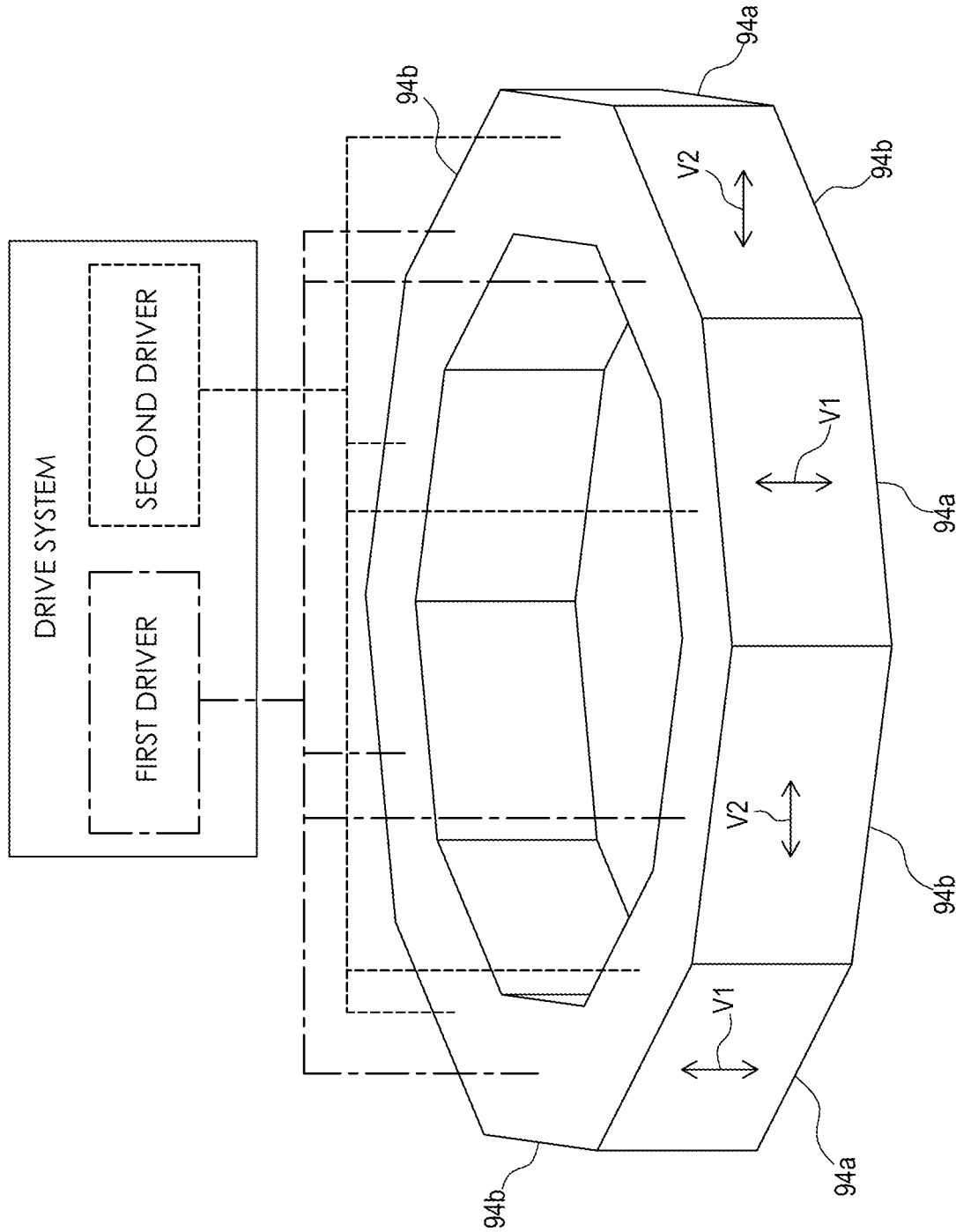
FIG. 6 is a schematic diagram of a first example piezoelectric transducer system that may be used for the second drive system of the present invention.

Referring now to FIG. 6 of the drawing, the example second drive system 32 is schematically depicted therein. The example second drive system 32 comprises a transducer 90 comprising a control system 92 and at least one drive segment 94. The example transducer 90 is a piezoelectric transducer comprising at least one first drive segment 94a and at least one second drive segment 94b. FIG. 3 illustrates that the example transducer 90 is supported by the handle portion 56 of the handle housing 50 of the handle assembly 22.

The example control system 92 comprises a first driver 96a for controlling the first drive segment(s) 94a and a second driver 96b for controlling the second drive segment (s) 96b.

The segments 94a and 94b are configured to generate movement along different vibrational axes and can be controlled individually or together to alter or otherwise adjust magnitude and/or direction of the vibrational movement generated by the example second drive system 32. Arrows V1 and V2 in FIG. 6 illustrate that the example transducer 90 is capable of vibrating in two different directions at angles to each other. The example transducer 90 as depicted in FIG. 32 is a relatively simple structure comprising five of the first drive segments 94a and five of the second drive segments 94b for a total of ten drive segments 94. Other configurations of transducers 90 and drive segments 94 forming the transducer 90 may be used depending on factors such as the size, geometry, weight, and material of the handle assembly 22.

The example control system 92 further comprises controls (not shown) such as switches and the like to control and coordinate operation of the first and second drivers 96a and 96b. Piezoelectric transducers such as the example transducer 90 and drive systems such as the example control system 92 are known, and the construction and operation of the example transducer 90 and control system 92 will not be described herein in further detail.

FIG. 5 illustrates that the example inlet 40 of the example tool 24 comprises first and second inlet portions 40a and 40b extending perpendicular to a tool passageway 44 extends along at least a portion of and is substantially aligned with the tool axis T. The example tool 24 comprises a support portion 24a sized and dimensioned to be snugly received by the chuck assembly 52 and a working portion 24b configured to perform an endodontic function as desired by a user of the example tool 24. The working portion 24b is a tapered surface machined to perform the desired endodontic function. The example tool 24 is typically made of a hollow metal cylinder such as that used to form a hypodermic needle that has been machined to define the working portion 24b and the inlet portion(s) 40. Alternatively, the example tool 24 may be cast, molded, machined, and/or otherwise shaped of materials such as composites, plastics, and the like as suitable for a desired endodontic procedure.

With the first example handpiece 20 assembled as shown in FIGS. 1 and 3, the example tool 24 is supported by the chuck assembly 52. In particular, the support portion 24a of the example tool 24 is inserted into a chuck passageway 52a defined by the chuck assembly 52 until the inlet portion(s) 40 are within the handle chamber 36. The chuck assembly 52 may be made, coated, and/or lined with a material that engages the support portion 24a to form at least a partial seal to inhibit or prevent flow of pressurized fluid between the chuck assembly 52 and the tool member 24.

In the assembled configuration, the example first drive system 30 may be operated to rotate the example tool 24 about the tool axis T. The example second drive system 32 may be operated to cause vibration of the transducer 90, and vibration of the example transducer 90 is transmitted to the tool 24 through the handle housing 50, the bearing assemblies 60 and 62, and the chuck assembly 52. The remote fluid source (not shown) may be operated to allow pressurized fluid to flow into the handle chamber 36. The rotation, vibration, and/or pressurized fluid may be operated individually, in any combination of two, or all at the same time depending on the needs of the user. Further, rotational speed, magnitude and direction of the vibrational forces, and pressure of the pressurized fluid may be controlled as required for the desired endodontic procedure. Buttons, triggers, foot pedals and the like may be used in a conventional manner to control the first drive system 30, the second drive system 32, and/or the remote fluid source (not shown) as desirable under a particular set of operating condition.

The example handpiece 20 may have utility without the use of pressurized fluid under certain circumstances. In particular, the remote fluid source may be shut off or otherwise disconnected from the example handpiece 20. Further, the example handle assembly 22 and/or tool 24 may be configured without fluid passageways that allow pressurized fluid to flow to a position adjacent to or at the tip 26, in which case the desired orthodontic procedure may be carried out by rotation and/or vibration of the tool 24.

The improved handle assembly 22 and tool 24 of the present invention of the present invention are typically combined during use. However, the handle assemblies of the present invention may be used with tools other than the drill bits described herein, and the tools of the present invention may be used with handle assemblies other than the example handle assemblies described herein.

II Second Example Endodontic Tool

The tool passageway of an example endodontic tool of the present invention may take forms other than the example tool passageway 44 of the example endodontic tool 24 as described above with reference to and depicted in FIGS. 2, 3, and 5. In the first example tool 24, the example tool inlet 40 is formed by a pair of openings formed at intersections of the inlet portions 40a and 40b with an outer cylindrical surface of the first example tool 24.

In contrast, FIGS. 7 and 8 illustrate a second example tool 120 taking the form of a tapered drill bit defining a tool inlet 122, a tool outlet 124, and a tool passageway 126. The example tool 120 may define any of the tool cross-sections described below. The example tool passageway 126 extends along at least a portion of and is substantially aligned with a tool axis T of the example tool 120. The example tool passageway 126 allows fluid communication between the example tool inlet 122 and the example tool outlet 124. In the second example tool 120, the example tool inlet 132 is formed by an opening formed at an intersection of the tool passageway 126 with an inner end surface 128 of the third example tool 130. Like the first example tool 24, the second example tool 120 comprises a support portion 120a sized and dimensioned to be snugly received by the chuck assembly 52 to transfer rotation of the chuck assembly 52 to the tool 120 and a working portion 120b configured to perform an endodontic function as desired by a user of the example tool 120.

III Third Example Endodontic Tool

FIGS. 9 and 10 illustrate a third example tool 130 taking the form of a tapered drill bit defining tool inlet 132, a tool outlet 134, and a tool passageway 136. The example tool 130 may define any of the tool cross-sections described below. The example tool passageway 136 extends along at least a portion of and is substantially aligned with a tool axis T of the example tool 120. The example tool passageway 136 allows fluid communication between the example tool inlet 132 and the example tool outlet 134. In the third example tool 130, the example tool inlet 132 is formed by a single opening formed at an intersection of the tool passageway 126 with an outer cylindrical surface 138 of the third example tool 130. Like the first example tool 24 and the second example tool 120, the example tool 130 comprises a support portion 130a sized and dimensioned to be snugly received by the chuck assembly 52 to transfer rotation of the chuck assembly 52 to the tool 130 and a working portion 130b configured to perform an endodontic function as desired by a user of the example tool 130.

IV. Second Example Endodontic Handpiece

Figure 11:
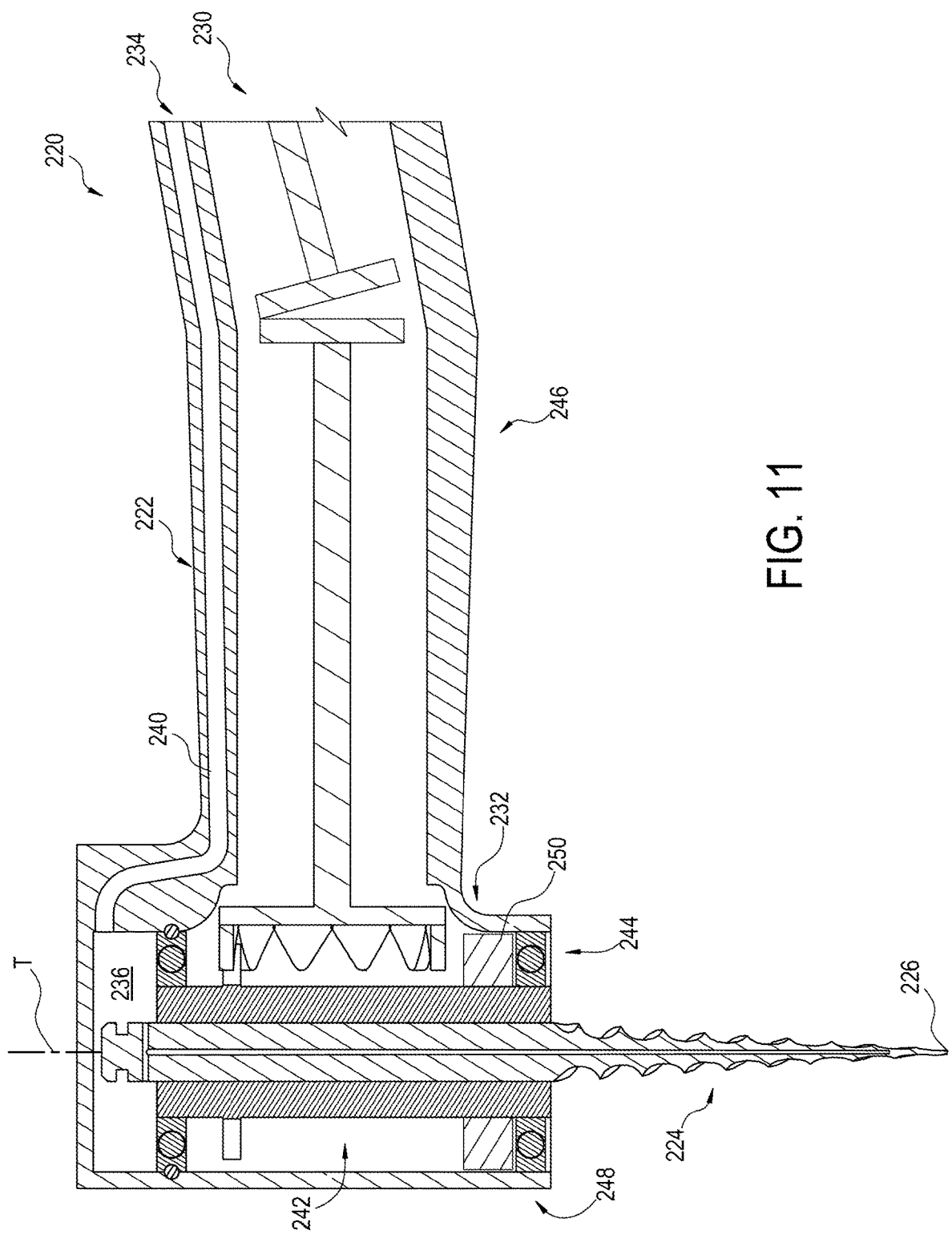
FIG. 11 is a side elevation section view of a second example handpiece of the present invention.

Referring now to FIG. 11 of the drawing, depicted at 220 therein is a second example handpiece 220 constructed in accordance with, and embodying, the principles of the present invention. The example handpiece 220 comprises a second example handle assembly 222 and a tool 224. The example tool 224 is or may be any one of the example tools 24, 120, or 130 described herein and may define any of the tool cross-sections described below. The second example handle assembly 222 supports the tool 224 for simultaneous axial rotation and vibration while also allowing pressurized fluid to flow out of the tool 224 at or near a tip 226 of the tool 224 as the tool 224 is rotated and vibrated. Like the example tool handpiece 20 described above, the second example handle assembly 222 typically comprises a cord assembly (not shown) that operatively connects second example handle assembly 222 to at least one source of energy (not shown).

The second example handle assembly 222 supports the tool 224. The second example handle assembly 222 further comprises a first drive system 230 for rotating the tool 224 about the example tool axis T and a second drive system 232 for generating a vibratory force that may cause vibration of the tool 224. FIGS. 22 and 23 further illustrate that the second example handle assembly 222 further comprises a fluid conduit system 234 that allows flow of pressurized fluid (not shown) to an example handle chamber 236 (FIG. 23) defined by the handle assembly 222.

The example handle assembly 222 further comprises a handle housing 240, a chuck assembly 242, and a bearing system 244. The example handle housing 240 defines a handle portion 246 and a head portion 248. The user grasps the handle portion 246, and the head portion 248 is typically configured to extend at an angle relative to the handle portion 246 appropriate for a particular endodontic task to be performed. The first drive system 230, fluid conduit assembly 234, handle housing 240, chuck assembly 242, bearing system 244 are or may be the same as the example first drive system 30, fluid conduit assembly 234, handle housing 50, chuck assembly 52, and bearing system 54 and will not be described again herein in detail.

As shown in FIG. 10, the example second drive system 232 comprises a transducer 250 and a control system (not shown). The example control system is or may be the same as the example control system 92 described above and will not be described in detail herein.

The example transducer 250 is in the form of a piezoelectric transducer. The example transducer 250 is supported by the head portion 248 of the handle housing 250 of the handle assembly 222.

The second example handpiece 220 is assembled and operated in a manner similar to that of the first example handpiece 20 described above.

The example handpiece 220 may have utility without the use of pressurized fluid under certain circumstances. In particular, the remote fluid source may be shut off or otherwise disconnected from the example handpiece 220. Further, the example handle assembly 222 and/or tool 224 may be configured without fluid passageways that allow pressurized fluid to flow to a position adjacent to or at the tip of the tool 224, in which case the desired orthodontic procedure may be carried out by rotation and/or vibration of the tool 224.

V. Third Example Endodontic Handpiece

Referring now to FIG. 11 of the drawing, depicted at 320 therein is a third example handpiece 320 constructed in accordance with, and embodying, the principles of the present invention. The example handpiece 320 comprises a third example handle assembly 322 and a tool 324. The example tool 324 is or may be any one of the example tools 24, 120, or 130 described herein and may define any of the tool cross-sections described below. The third example handle assembly 322 supports the tool 324 for simultaneous axial rotation and vibration while also allowing pressurized fluid to flow out of the tool 324 at or near a tip 326 of the tool 324 as the tool 324 is rotated and vibrated. Like the example tool handpiece 30 described above, the fourth example handle assembly 322 typically comprises a cord assembly (not shown) that operatively connects third example handle assembly 322 to at least one source of energy (not shown).

The third example handle assembly 322 supports the tool 324. The third example handle assembly 322 further comprises a first drive system 330 for rotating the tool 324 about the example tool axis T and a second drive system 332 for generating a vibratory force that may cause vibration of the tool 324. The third example handle assembly 322 further comprises a fluid conduit system 334 that allows flow of pressurized fluid (not shown) to an example handle chamber 336 (FIG. 33) defined by the handle assembly 322.

The example handle assembly 322 further comprises a handle housing 340, a chuck assembly 342, and a bearing system 344. The example handle housing 340 defines a handle portion 346 and a head portion 348. The user grasps the handle portion 346, and the head portion 348 is typically configured to extend at an angle relative to the handle portion 346 appropriate for a particular endodontic task to be performed. The first drive system 330, fluid conduit assembly 334, handle housing 340, chuck assembly 342, bearing system 344 are or may be the same as the example first drive system 230, fluid conduit assembly 34, handle housing 50, chuck assembly 52, and bearing system 54 and will not be described again herein in detail.

The example second drive system 332 comprises a transducer 350 and a control system (not shown). The example control system 352 is or may be the same as the example control system 92 described above and will not be described in detail herein.

Figure 12:
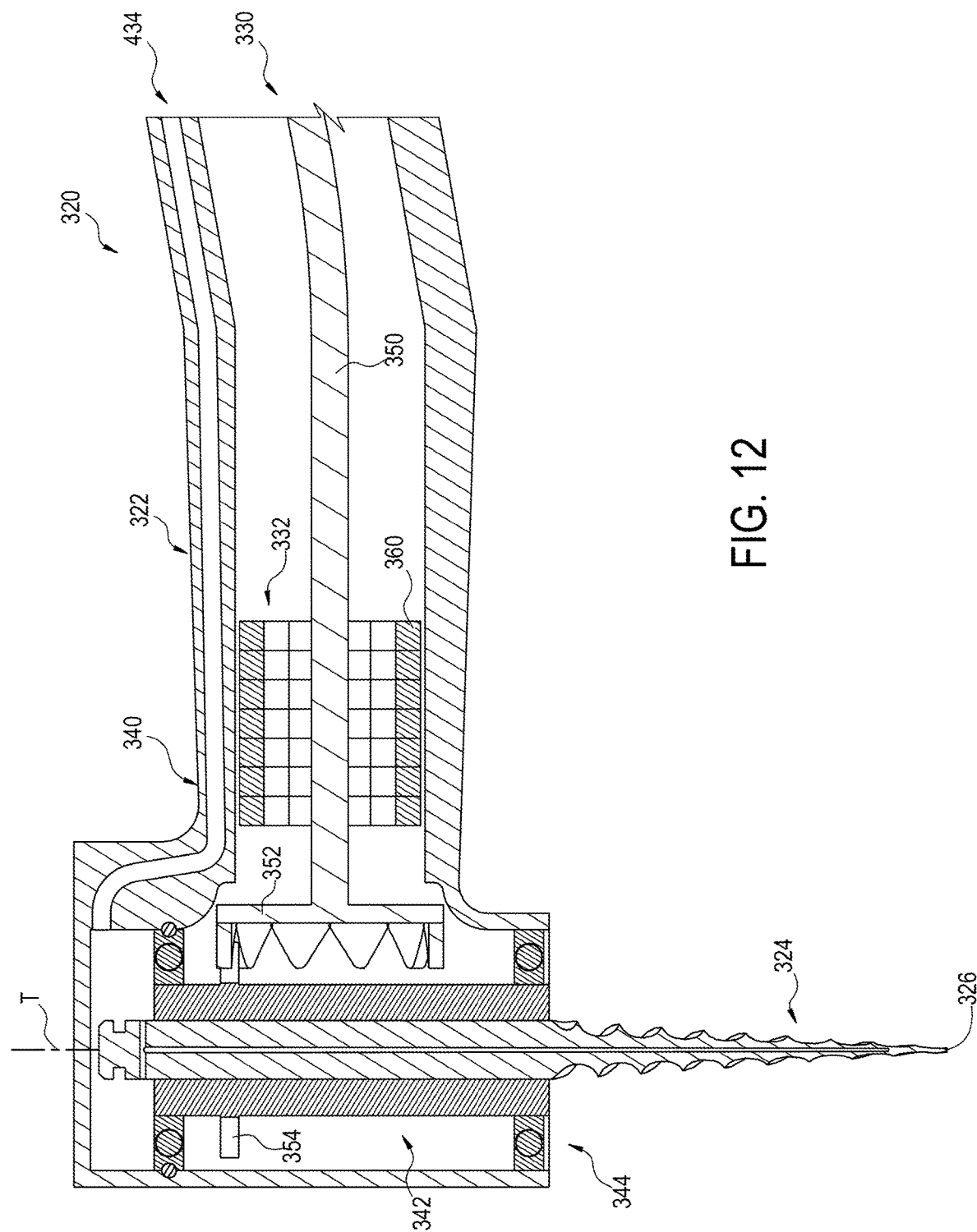
FIG. 12 is a side elevation section view of a third example handpiece of the present invention.

FIG. 12 illustrates that the example first drive system 330 comprises a flexible shaft 350 and a handle gear 352. The example shaft 350 may be held in a predetermined curve while transmitting rotational movement to the handle gear 352 and then to a chuck gear 354 of the chuck assembly 442.

FIG. 12 further illustrates that the example second drive system 332 comprises a transducer 360 in the form of a piezoelectric transducer. The example transducer 360 is supported by the body portion 348 of the handle housing 350 of the handle assembly 322.

The third example handpiece 320 is assembled and operated in a manner similar to that of the first example handpiece 20, 220, and 320 described above.

The example handpiece 320 may have utility without the use of pressurized fluid under certain circumstances. In particular, the remote fluid source may be shut off or otherwise disconnected from the example handpiece 320. Further, the example handle assembly 322 and/or tool 324 may be configured without fluid passageways that allow pressurized fluid to flow to a position adjacent to or at the tip of the tool 324, in which case the desired orthodontic procedure may be carried out by rotation and/or vibration of the tool 324.

VI. Fourth Example Endodontic Handpiece

Figure 13:
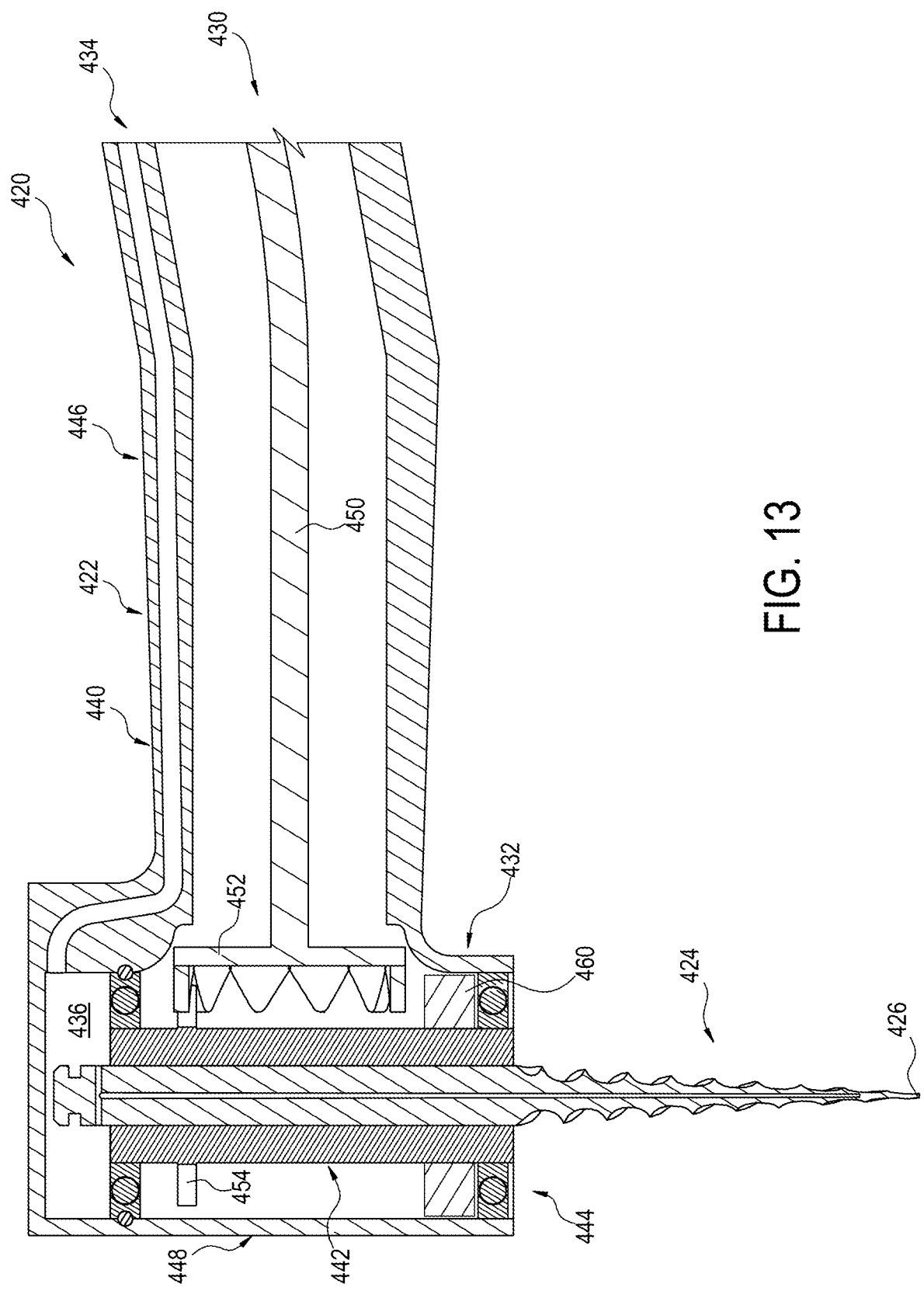
FIG. 13 is a side elevation section view of a third example handpiece of the present invention.

FIG. 13 of the drawing depicts a fourth example handpiece 420 constructed in accordance with, and embodying, the principles of the present invention. The example handpiece 420 comprises a fourth example handle assembly 422 and a tool 424. The example tool 424 is or may be any one of the example tools 24, 120, or 130 described herein and may define any of the tool cross-sections described below. The fourth example handle assembly 422 supports the tool 424 for simultaneous axial rotation and vibration while also allowing pressurized fluid to flow out of the tool 424 at or near a tip 426 of the tool 424 as the tool 424 is rotated and vibrated. Like the example tool handpiece 20 described above, the fourth example handle assembly 422 typically comprises a cord assembly (not shown) that operatively connects third example handle assembly 422 to at least one source of energy (not shown).

The fourth example handle assembly 422 supports the tool 424. The fourth example handle assembly 422 further comprises a first drive system 430 for rotating the tool 424 about the example tool axis T and a second drive system 432 for generating a vibratory force that may cause vibration of the tool 424. The fourth example handle assembly 422 further comprises a fluid conduit system 434 that allows flow of pressurized fluid (not shown) to an example handle chamber 436 defined by the handle assembly 422.

The example handle assembly 422 further comprises a handle housing 440, a chuck assembly 442, and a bearing system 444. The example handle housing 440 defines a handle portion 446 and a head portion 448. The user grasps the handle portion 446, and the head portion 448 is typically configured to extend at an angle relative to the handle portion 446 appropriate for a particular endodontic task to be performed. The second drive system 432, fluid conduit assembly 434, handle housing 440, chuck assembly 442, bearing system 444 are or may be the same as the example first drive system 40, fluid conduit assembly 434, handle housing 50, chuck assembly 52, and bearing system 54 and will not be described again herein in detail.

FIG. 13 shows that the example first drive system 432 comprises a flexible shaft 450 and a handle gear 452. The example shaft 450 may be held in a predetermined curve while transmitting rotational movement to the handle gear 452 and then to a chuck gear 454 of the chuck assembly 442.

FIG. 13 also shows that the example second drive assembly 432 comprises a transducer 460 supported in the head portion 448 of the handle assembly 422.

The fourth example handpiece 420 is assembled and operated in a manner similar to that of the first example handpieces 20 and 220 described above.

The fourth example handpiece 420 may have utility without the use of pressurized fluid under certain circumstances. In particular, the remote fluid source may be shut off or otherwise disconnected from the example handpiece 420. Further, the example handle assembly 422 and/or tool 424 may be configured without fluid passageways that allow pressurized fluid to flow to a position adjacent to or at the tip of the tool 424, in which case the desired orthodontic procedure may be carried out by rotation and/or vibration of the tool 424.

VII. Examples of Tool Profiles

As described above, the first, second, and third example tools 24, 120, and 130 each defines a support portion (24a, 120a, and 130a, respectively) and a working portion (24b, 120b, and 130b, respectively).

The working portion of the endodontic tool(s) of the present invention are, as generally described above, configured to perform an endodontic function as desired by a user of the example tool 130. Several example configurations of the working portions (e.g., 24b, 120b, and 130b) of an endodontic tool of the present invention may take different configurations as depicted in FIGS. 14A-14H.

Initially, it should be noted that, as described and depicted above, the example support portions 24a, 120a, and 130a are substantially cylindrical and the working portions 24b, 120b, and 130b are generally tapered and thus are generally frustoconical in overall shape. The cylindrical support portions are generally conventional and facilitate engagement of the support portions with the chuck assembly 52.

The working portions 24b, 120b, and 130b may take forms other than tapered or frustoconical. For example, the working portions 24b, 120b, and 130b may be cylindrical, a combination of frustoconical and cylindrical, and/or other discontinuous shapes as helpful to fulfill a desired endodontic purpose.

Further, the example working portions 24b, 120b, and 130b are designed to define edges and surfaces that come into contact with the structure being worked on. These edges and surfaces are defined by a number of parameters, such as pitch of a tapered thread, diameter at any point along the working portion, and/or numbers of edges and surfaces. Examples of combinations of edges and surfaces for a number of example working portions are depicted in FIGS. 14A-14H, and any of these combinations of edges and surfaces may be applied to any of the example working portions 24b, 120b, and 130b.

Referring initially to FIG. 14A, depicted therein is a first example cross-sectional shape 520 comprising three sides 522a, 522b, and 522c that intersect at three edges 524a, 524b, and 524c, with angles between adjacent pairs of the sides 522a, 522b, and 522c being the same (e.g., triangular). The example sides 522a, 522b, and 522c are equal in length and substantially flat or straight in cross-section as depicted in FIG. 14A but are not necessarily flat in three dimensions. The lengths of the sides 522 may be equal or may differ depending on the specific purposes of the tool embodying the shape 520. With a generally cylindrical working portion, the dimensions of the sides 522a, 522b, and 522c in cross-section are substantially equal along the length of the working portion. With a generally tapered working portion, the dimensions of the sides 522a, 522b, and 522c in cross-section will decrease from the support portion to the tip of the tool.

Referring now to FIG. 14B, depicted therein is a second example cross-sectional shape 530 comprising four sides 532a, 532b, 532c, and 532d that intersect at four edges 534a, 534b, 534c, and 534d, with angles between adjacent pairs of the sides 532a, 532b, 532c, and 532d being the same (e.g., square). The example sides 532a, 532b, 532c, and 532d are equal in length and substantially flat or straight in cross-section as depicted in FIG. 14B but are not necessarily flat in three dimensions. The lengths of the sides 532 may be equal or may differ depending on the specific purposes of the tool embodying the shape 530. With a generally cylindrical working portion, the dimensions of the sides 532a, 532b, 532c, and 532d in cross-section are substantially equal along the length of the working portion. With a generally tapered working portion, the dimensions of the sides 532a, 532b, 532c, and 532d in cross-section will decrease from the support portion to the tip of the tool.

Referring now to FIG. 14C, depicted therein is a third example cross-sectional shape 540 comprising four sides 542a, 542b, 542c, and 542d that intersect at four edges 544a, 544b, 544c, and 544d, with two different angles between defined by adjacent pairs of the sides 542a, 542b, 542c, and 542d (e.g., rhomboid). The example sides 542a, 542b, 542c, and 542d are equal in length and substantially flat or straight in cross-section as depicted in FIG. 14C but are not necessarily flat in three dimensions. The lengths of the sides 542 may be equal or may differ depending on the specific purposes of the tool embodying the shape 540. With a generally cylindrical working portion, the dimensions of the sides 542a, 542b, 542c, and 542d in cross-section are substantially equal along the length of the working portion. With a generally tapered working portion, the dimensions of the sides 542a, 542b, 542c, and 542d in cross-section will decrease from the support portion to the tip of the tool.

Referring now to FIG. 14D, depicted therein is a fourth example cross-sectional shape 550 comprising five sides 552a, 552b, 552c, 552d, and 552e that intersect at five edges 554a, 554b, 554c, 554d, and 554e with angles between adjacent pairs of the sides 552a, 552b, 552c, 552d, and 552e being substantially the same (e.g., pentagonal). The example sides 552a, 552b, 552c, 552d, and 552e are equal in length and substantially flat or straight in cross-section as depicted in FIG. 14D but are not necessarily flat in three dimensions. The lengths of the sides 552 may be equal or may differ depending on the specific purposes of the tool embodying the shape 550. With a generally cylindrical working portion, the dimensions of the sides 552a, 552b, 552c, 552d, and 552e in cross-section are substantially equal along the length of the working portion. With a generally tapered working portion, the dimensions of the sides 552a, 552b, 552c, 552d, and 552e in cross-section will decrease from the support portion to the tip of the tool.

Figure 14F:
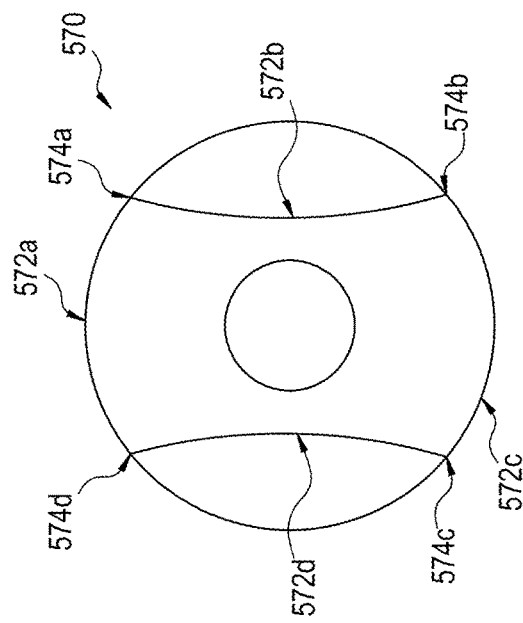
Figure 14H:
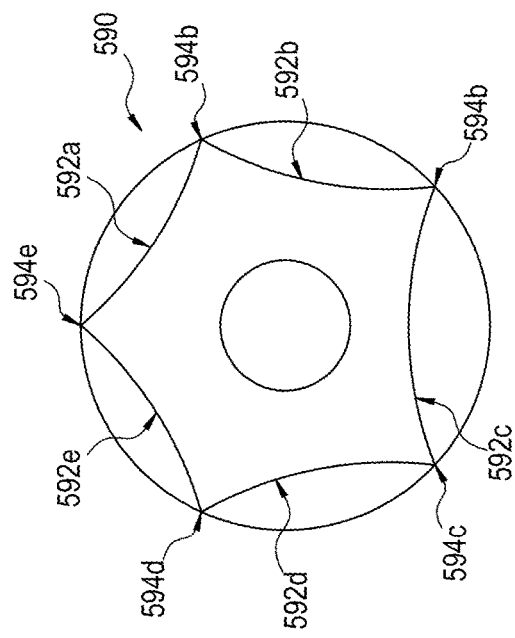
Figure 14E:
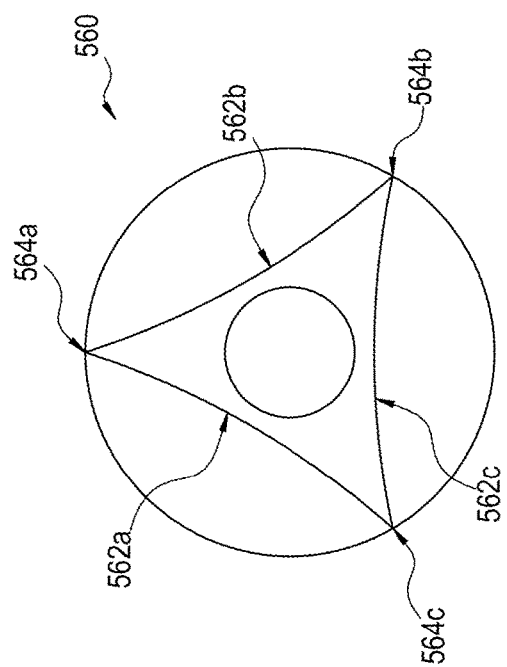

Referring now to FIG. 14E, depicted therein is a fifth example cross-sectional shape 560 comprising three sides 562a, 562b, and 562c that intersect at three edges 564a, 564b, and 564c, with angles between adjacent pairs of the sides 562a, 562b, and 562c being the same (generally triangular). The example sides 562a, 562b, and 562c are equal in length and substantially curved or discontinuous in cross-section as depicted in FIG. 14E. The lengths of the sides 562 may differ depending on the specific purposes of the tool embodying the shape 560. The example sides 562a, 562b, and 562c are concave in cross-section and also curved or shaped in three dimensions. With a generally cylindrical working portion, the dimensions of the sides 562a, 562b, and 562c in cross-section are substantially equal along the length of the working portion. With a generally tapered working portion, the dimensions of the sides 562a, 562b, and 562c in cross-section will decrease from the support portion to the tip of the tool.

Referring next to FIG. 14F, depicted therein is a sixth example cross-sectional shape 570 comprising four sides 572a, 572b, 572c, and 572d that intersect at four edges 574a, 574b, 574c, and 574d (generally square). In the sixth example cross-sectional shape 570, opposing sides 572a and 572c are convex in cross-section, while opposing sides 572b and 572 are concave in cross-section. The lengths of the sides 572 may be equal or may differ depending on the specific purposes of the tool embodying the shape 570. With a generally cylindrical working portion, the dimensions of the sides 572a, 572b, and 572c in cross-section are substantially equal along the length of the working portion. With a generally tapered working portion, the dimensions of the sides 572a, 572b, and 572c in cross-section will decrease from the support portion to the tip of the tool.

Figure 14G:
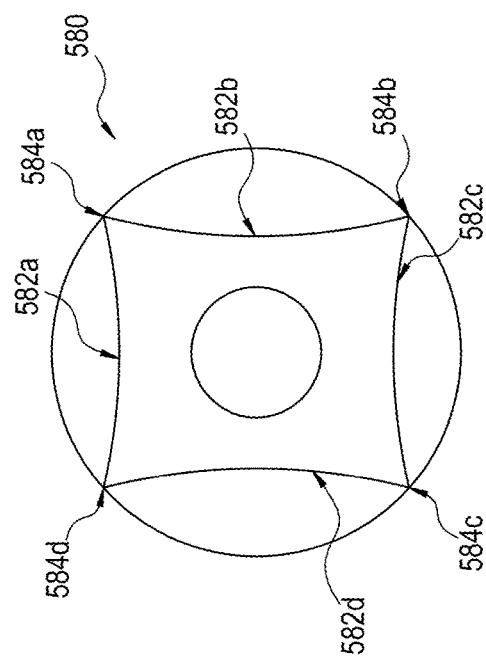

FIG. 14G depicts a seventh example cross-sectional shape 580 comprising four sides 582a, 582b, 582c, and 582d that intersect at four edges 584a, 584b, 584c, and 584d, with angles between adjacent pairs of the sides 582a, 582b, 582c, and 582d being the same (generally square). The example sides 582a, 582b, 582c, and 582d are equal in length and substantially curved or discontinuous in cross-section as depicted in FIG. 14G. The lengths of the sides 582 may differ depending on the specific purposes of the tool embodying the shape 580. The example sides 582a, 582b, 582c, and 582d are concave in cross-section and also curved or shaped in three dimensions. With a generally cylindrical working portion, the dimensions of the sides 582a, 582b, 582c, and 582d in cross-section are substantially equal along the length of the working portion. With a generally tapered working portion, the dimensions of the sides 582a, 582b, 582c, and 582d in cross-section will decrease from the support portion to the tip of the tool.

FIG. 14H depicts an eighth example cross-sectional shape 590 comprising five sides 592a, 592b, 592c, 592d, and 592e that intersect at five edges 594a, 594b, 594c, 594d, and 594e with angles between adjacent pairs of the sides 582a, 582b, 582c, 582d, and 584e being the same (generally pentagonal). The example sides 592a, 592b, 592c, 592d, and 592e are equal in length and substantially curved or discontinuous in cross-section as depicted in FIG. 14H. The lengths of the sides 592 may differ depending on the specific purposes of the tool embodying the shape 590. The example sides 592a, 592b, 592c, 592d, and 592e are concave in cross-section and also curved or shaped in three dimensions. With a generally cylindrical working portion, the dimensions of the sides 592a, 592b, 592c, 592d, and 592e in cross-section are substantially equal along the length of the working portion. With a generally tapered working portion, the dimensions of the sides 592a, 592b, 592c, 592d, and 592e in cross-section will decrease from the support portion to the tip of the tool.

VII. Additional Considerations

The present invention may be embodied as a handpiece comprising at least one rotary system to rotate endodontic files for enlarging, shaping, and cleaning teeth and/or root canal, and at least one piezoelectric material to generate the vibration, sonic wave, and/or ultrasonic wave for irritation, cleaning, and/or disinfection of root canal. The rotary systems include, but not limit to, electric motor rotary system and compressed gas rotary system. The electric rotary system included, but not limited to, electric control system, electric motor, flexible shafts, and gear power transmission etc. The ultrasonic system includes, but not limited to, piezoelectric material, bar or horn to connect the file or tip. One embodiment, the mechanical powder transmission from electric motor to file or tip is used a flexible shafts, which vibration and ultrasonic wave will not affect the rotation of file or tips. In the one embedment, a needle-like tip or file are used to supply liquid for the root can shaping, cleaning, and disinfection. Also, the vacuum system can be used to sock out the fluid from root canal to enhance the performance. The various vibration pattern of piezoelectric material will be designed and controlled according to clinical application.

Piezoelectric materials produce an electrical voltage in response to an applied force. Piezoelectricity is an electric charge that accumulates in certain materials such as crystals, ceramics and bone, when a stress or strain is applied to the material. Materials demonstrating the piezoelectric effect also show the opposite effect called converse piezoelectric effect. This means a piezoelectric material becomes deformed, as if undergoing stress, when being exposed to an electrical field. Put briefly, piezoelectric materials create electricity when stress is applied, and become stressed when electricity is applied.

Endodontic files are surgical instruments used by dentists when performing root canal treatment. These tools are used to clean and shape the root canal, with the concept being to perform complete chemo mechanical debridement of the root canal to the length of the apical foramen. Preparing the canal in this way facilitates the chemical disinfection to a satisfactory length but also provides a shape conducive to obturation (filling of the canal).

A handpiece is a hand-held, mechanical, electro-mechanical, hydraulic, and/or pneumatic instrument used to perform a variety of common dental procedures, including removing decay, polishing fillings, and altering prostheses. The handpiece itself consists of internal mechanical components which initiate a rotational force and provide power to the cutting instrument, usually a dental burr or an endodontic file. The type of apparatus used clinically will vary depending on the required function dictated by the dental procedure. It is common for a light source and cooling water-spray system to also be incorporated into certain handpieces; this improves visibility, accuracy and overall success of the procedure.

A rotary system is the subsystem of a handpiece that rotates or drives the tip or endodontic file rotation.

As generally described above, a handpiece of the present invention is used to properly shape root canal for root canal obturation, cleaning disinfection tissue with minimum removal of dentin structure. The advantage of the handpiece is very effective and easy to use. A handpiece can shape, clean, irritate, disinfect root canal at the same time, which very effective and time saving.

The use of an ultrasonic rotary handpiece of the present invention can significantly reduce the possibility of lock-up or imparting excessive torque and internal stress to a file, yet continues removal of debris from the root canal. Also, the handpiece of the present invention may be used to implement a process to apply negative pressure to pump the cleaning solution to circulate in root canal. This is a process with 4D to shape and clean root canal with minimally invasive Endodontics. The 4D process that may be implemented by a handpiece of the present invention compress mechanical shaping and cleaning, chemical irritation, and cleaning, ultrasonic cleaning, and cleaning liquid circulation with negative pressure at the same time for root canal treatment.

A handpiece of the present invention typically comprises at least a rotary system to rotate endodontic files for enlarging, shaping, and cleaning teeth and/or root canal, and at least one piezoelectric material as a main component to generate the vibration, sonic wave, and/or ultrasonic wave for irrigation, cleaning, and/or disinfection of root canal, and at least a rotation head to hold the endodontic file.

The rotary system of the present invention includes, but is not limited to, electric motor rotary system and compressed gas rotary system. An electric rotary system included, but is not limited to, an electric control system, an electric motor, flexible shafts, and/or gears.

Mechanical power transmission from elector motor to file or tip may use a flexible shaft, in which case transmission of vibration and/or ultrasonic wave is less likely to affect the rotation of file or tips. The various vibration pattern of piezoelectric material will be designed and controlled according to clinical application. The rotation head in present invention comprises at least one clamp or drill chuck to hold endodontic files.

In one embodiment of electric motor rotary system, a flexible shaft may be used to transmit rotation power to rotation head to drive the tips or endodontic files, but any suitable rotation transmission shaft for present invention may be used. Flexible shafts can transmit rotation around, under, over or through obstructions. and can accommodate misalignment, vibration, torque shock, and movement of driving and driven components. If space is a problem, flexible shafts allow the driving unit (electric motor or power takeoff) to be located remotely. This allows a powerful source to transmit rotation into a small space. A flexible shaft design may inhibit or avoid interference between rotation and vibration on rotation head at the same time.

A control system for an electric motor may be used to control the rotation of the file in multiple directions (e.g., clockwise and counterclockwise) and may be sequence to rotate in different directions sequentially.

The file rotation speed may be in a first range of 10 rpm-50,000 rpm and in any event may be within a second range of 100 rpm-30,000 rpm. The electric motor can be powered by direct current (DC) sources, such as from batteries, motor vehicles or rectifiers, or by alternating current (AC) sources, such as a power grid, inverters or electrical generators. The rotation speed of files can be automatically changed according to the design of pattern and clinical applications. Also, the control system for piezoelectric ultrasonic system is to control the vibration frequency in a frequency range from 50 Hz to 100,000 Hz and in an amplitude range from 1 μm to 1000 μm.

An example handpiece of the present invention may be driven by compressed gas to rotates at high speed with low torque. The use of an ultrasonic vibration system can prevent lock-up of the file or tips. The use of ultrasonic vibration renders low torque less of an issue when using a rotary handpiece.

Another object of the invention is to yield an improved air driven dental handpiece, in which the air path through the turbine is reduced in length to a minimum and graduated in size, increasing in volume as it progresses and smoothly directed with minimum turbulence to an enlarged outlet for the purpose of reducing sound level, increasing torque, and thereby reducing the volume and pressure of air required.

The ultrasonic system of the present invention may include, but is not limited to, piezoelectric material and a bar or horn to connect the file or tip. Piezoelectric material can be designed and configured in a variety of shapes to generate different vibrate motions as clinically required. The shapes of piezoelectric materials include, but are not limited to, cylinders, prisms, cubes, cones, spheres, rings, hollow cylinders, hollow prisms, hollow prisms with different piezoelectric materials, multi-layer structures, and mixture thereof.

As one example, a hexagonal prism has six sides and each side may be made of different piezoelectric materials. In this example, each side generates multi-vibration patterns that may be custom created or predetermined according to operational requirements. As another examples, two or more hollow prisms may be made by using different piezoelectric materials to generate special vibration patterns. These hollow prisms are combined together to generate special vibration pattern.

The piezoelectric materials in present invention include, but not limited to, ceramics, crystals, polymeric materials, composite, and mixture thereof. Also, there are more than one piezoelectric material can be used to generate the motion in multi-direction. For instance, two pairs of piezoelectric crystals may be used. One pair is polarized to product longitudinal motion and the other pair is polarized to produce torsional motion.

As another example, three pair piezoelectric crystals may be used for one handpiece. The first pair piezoelectric crystal generates the motion in X direction, the second pair piezoelectric crystal generates the motion in Y direction, and the third pair piezoelectric crystal generates the motion in Z direction. This is referred to herein as a "3D motion" design, and the motion pattern in each direction can be design individually adjusted or predetermined according to clinical requirements, including but not limited to, different frequencies in different motion directions and different motion strengths in different motion directions.

In another embedment, the handpiece may be formed of a stack of laminations to which is connected a hollow acoustic impedance transformer and flexible power transmission shaft to contact work tip or files. A housing is provided which fits around the laminations and a portion of the acoustic impedance transformer. The housing often has embedded therein the coils for providing the electrical energy to the laminations. The direction of vibration of the acoustic impedance transformer is longitudinal along a length of the handpiece. The flexible shaft may be used as rotary system to transmit mechanical power to drive the working tip or file.

In another embodiment, a tube may be designed to supply the liquid to tips or files to remove dentine debris, infection, and biofilms etc. The dynamic fluid is supplied through interface between tips and dynamic fluid tube to allow for the rotation of the tip or file in high speed without seal leakage. The rotary coupling features low friction materials, smooth finish, and a small radius to reduce the frictional torque generated from the force of the interference fit. The negative pressure can pump liquid out of root canal, which effectively remove all debris, infectious matter, and biofilms from the root canal.

In yet another embodiment, a needle-like tip or file may be used to supply liquid for the root can shaping, cleaning, and disinfection. In this context, a vacuum system can be used to suck out the fluid from root canal to enhance the performance.

A novel design, manufacturing process, and use of an endodontic needle file comprises the formation of at least one longitudinal hole extending inside at least a portion of the file (similar to injection needle) to deliver the liquid to tips of the files, and at least one endodontic file feature in outside the file for shaping, cutting, cleaning and disinfection of the root canal. The liquid is delivered to the file tip through the needle hole from the handle supporting the file to the tip of the file. Such needle files can be made by using materials, including, but not limited to, metals, alloys, plastic, composite, and mixture thereof.

The concept of design is to remove the debris out of root canal during mechanical shaping process and chemical cleaning process simultaneously. The needle files are designed to have an interior longitudinal hole, like an injection needle. Fluid such as liquid may be injected from the handle assembly, into the interior longitudinal hole, and out of a hole at or adjacent to a tip of files. These files are used to clean and shape the root canal, with the concept being to perform complete chemo-mechanical debridement of the root canal to the length of the apical foramen. The use of compressed fluid such as liquids creates a flow of liquid that can be very effective a removing debris created or removed during the mechanical shaping process, the ultrasonic cleaning process, and the like.

The liquid flow can be used to create negative pressure in the root canal that sucks sucking the liquid out of the root canal. In this case, a purpose of the negative pressure is to avoid or prevent any debris or disinfection liquid from entering the apex of root canal. Such needle files can be used as endodontic rotary files, hand files, and ultrasonic tips.

In present invention, the needle files can be made having a multi-taper shape. Multi-tapering needle files can increase cutting efficiency, reduce friction, and reduce torque loading on the instrument. Also, multi-tapering of a needle file can decrease the percentage of cutting surfaces in contact with the root canal wall at any given time, thereby increasing localized cutting forces or bearing pressures of each engaged cutting edge portion while simultaneously reducing overall torque loading of the instrument.

The shape of a cross-section of the needle file includes, but is limited to, triangle, right triangle, square, rectangle, parallelogram, pentagonal, Hexagon, Heptagon, Nonagon, 3 point stars, 4-point star, 5 point star, 6-point star, 7-point star, and 8-point star.

The materials are used for manufacturing the needle files of present invention may include, but are not limited to, metals, alloys, oxides, plastics, composites, and mixtures thereof. Metals that may be used to fabricate a needle file of present invention, include, but are not limited to, Aluminum, Gallium, Indium, Tin, Thallium, Bismuth, Scandium, Titanium, Vanadium, Chromium, Manganese, Iron, Cobalt, Nickel, Copper, Zinc, Yttrium, Zirconium, Niobium, Molybdenum, Tantalum, Tungsten, Rhenium, Platinum, Gold, Cerium, Ytterbium and mixture thereof. Allows that may be used to fabricate a needle file of present invention, include, but are not limited to, Aluminum Alloys, Cobalt Alloys, Copper Alloys (Brass), Bronze (copper, tin, aluminum, or any other element), Aluminum bronze (copper, aluminum), Arsenical bronze (copper, arsenic), Nickel silver (copper, nickel), Gold Alloys, Indium Alloys, Iron or Ferrous Alloys, Steel (carbon), Stainless steel (chromium, nickel), Surgical stainless steel (chromium, molybdenum, nickel), Silicon steel, Magnesium Alloys, Mercury Alloys, Nickel Alloys, Ni—Ti alloys, Silver Alloys, Tin Alloys, Titanium Alloys, Zinc Alloys, and mixture thereof.

In one embodiment, NiTi tubes are used for making the endodontic needle files. One advantages of NiTi alloy tubes in comparison to stainless steel tubes is flexibility. Further, any fracture issues associated NiTi endodontic instruments can be solved by proper heat treatment of the instrument.

Fracture due to torsion occurs when the tip or another part of the instrument binds within the canal whilst the handpiece keeps turning, resulting in the elastic limit of the NiTi endodontic instrument being exceeded. Torsional stress typically occurs during cutting action in the canal. a needle file can provide continuous flow of liquid to remove the debris, thereby reducing torsional stress.

Needle files of the present invention can be manufactured by using the metal tube shape materials. The inside diameter of the tube is typically in the range of 0.01 mm-4 mm. The outside diameter of the tube is typically in the range of 0.1 mm to 10 mm. The process for making needle files includes, but is not limited to, machine grinding, twisting, injection molding, heat pressing, and combinations thereof.

The holes of needle files for allowing the flow of liquid into the needle file may be the side of the files, and hole(s) for allowing liquid to flow out of the needle file are typically along a shaft of the needle file adjacent to a tip end of the needle file.

An electropolishing process may be used for the treatment of endodontic needle files of the present invention. Electropolishing is a finishing technique that is used to treat nickel titanium (nitinol), stainless steel, and many other alloys. The two most common finishes for nickel titanium are electropolishing and chemical etching. Both of these methodologies remove surface material from the metal, leaving it exceedingly smooth. In addition to an improvement in surface finish, there is actually a modification in the surface chemistry of the nickel titanium. Elemental nickel is removed, leaving an oxide film of 10-20 angstroms.

Plastics are used for making the needle files in present invention, including, but not limited to, thermoplastics, thermosetting polymer, amorphous plastics, crystalline plastics, biodegradable plastics, bioplastics, conductive polymers, and mixtures or composites thereof. More specifically, plastic materials that may be used to form a needle file of the present invention, including, but not limited to, Polyamides (PA), nylons, Polycarbonate (PC), Polyester (PES), Polyethylene (PE), High-density polyethylene (HDPE), Low-density polyethylene (LDPE), Polyethylene terephthalate (PET), Polypropylene (PP), Polystyrene (PS), High impact polystyrene (HIPS), Polyurethanes (PU), Polyvinyl chloride (PVC), Polyvinylidene chloride (PVDC), Acrylonitrile butadiene styrene (ABS), Polycarbonate+Acrylonitrile Butadiene Styrene (PC+ABS), Polyethylene+Acrylonitrile Butadiene Styrene (PE+ABS), Polyepoxide (epoxy), Polymethyl methacrylate (PMMA), Polytetrafluoroethylene (PTFE), or Teflon, Phenolics or phenol formaldehyde (PF), Melamine formaldehyde (MF), Urea-formaldehyde (UF), Polyetheretherketone (PEEK), Maleimide/bismaleimide, Polyetherimide (PEI) (Ultem), Polyimide, Polylactic acid (PLA), Silicone poly, Polydiketoenamine (PDK) etc, and mixture of thereof.

Plastic needle files may be made by injection molding process for mass production, precision size, and low cost. Also, the plastic endodontic file can be made by a hot-pressing process.

The advantages of plastic needle files are to select the different hardness of plastics for different applications. For example, if the hardness of plastic materials is higher than that of dentin, the plastic needle files can be used for cutting and shaping root canal. However, if the hardness of plastic materials is below that of dentin, the plastic needle files will mainly be used for removing biofilm and cleaning applications only, which avoid removing more dentin structures.

In present invention, the liquid delivered to tip through the hole of needle file includes, but is not limited to, water, water solution, disinfection solution, organic solvents, inorganic salt solutions, and/or mixtures thereof. In another embodiment, negative pressure may be used to suck out the liquid from the root canal. The circulation of liquid helps keep root canal clean from debris and infection free, and also inhibits or prevents debris, infection, and any liquid from exiting the root canal through the root canal apex.

Endodontic needle files in present invention can be used as rotary files, ultrasonic tips, and ultrasonic-rotary files.

What is claimed is:

1. An endodontic handpiece for at least one of mechanical debridement and fluid cleaning of a root canal, the endodontic handpiece comprising: a handle assembly comprising:
    a handle housing defining a handle chamber and a first seal recess, a chuck assembly,
    a bearing system for supporting the chuck assembly for rotation relative to the handle housing, the bearing system comprising at least one bearing assembly defining a second seal recess, and
    an O-ring arranged to be supported by the first seal recess and the second seal recess,
    a first drive system for rotating the chuck assembly, and
    a second drive system for imparting a vibratory force to the chuck assembly; and
    a needle file defining a support portion adapted to engage the chuck assembly,
    a tip,
    a working portion configured to mechanically debride of the root canal,
    an inlet located in the support portion,
    an outlet located adjacent to or at the tip, and
    a passageway extending between the inlet and the outlet such that the inlet and the outlet are in fluid communication with the passageway;
    wherein the bearing system engages the chuck assembly and the chuck assembly engages the support portion of the needle file such that the O-ring, the bearing assembly, and the chuck assembly seal the handle chamber, the inlet is located within the sealed handle chamber;

the first and second drive systems are located outside of the sealed handle chamber and operatively connected to the chuck assembly such that movement of the first and second drive systems is transferred to the chuck assembly, and movement of the chuck assembly is transferred to the needle file;

each of the first and second drive systems is controllable to operate in at least first, second, and third modes such that the working portion of the needle file mechanically debrides the root canal, where in the first mode, the first drive system causes rotation of the needle file, in the second mode, the second drive system causes vibration of the needle file, and in the third mode the first drive system causes rotation of the needle file, and the second drive system causes vibration of the endodontic tool; and pressurized fluid is caused to flow through the sealed handle chamber, through the inlet, through the passageway, and out of the outlet to perform fluid cleaning of the root canal while the endodontic handpiece operates in at least one of any of the first, second, and third modes.

2. The endodontic handpiece as recited in claim 1, in which the pressurized fluid contains materials for chemical cleaning of the root canal.

3. The endodontic handpiece as recited in claim 1, in which the working portion of the needle file defines a cross-sectional shape defining at least two sides and at least two edges.

4. The endodontic handpiece as recited in claim 3, in which, in cross-section, at least one of the at least two sides is flat, concave, or convex.

5. The endodontic handpiece as recited in claim 1, in which the working portion of the needle file defines a cross-sectional shape selected from the group of cross-sectional shapes consisting of triangular, square, rhomboidal, pentagonal, substantially triangular, and substantially square.

6. An endodontic handpiece for at least one of mechanical debridement and fluid cleaning of a root canal, the endodontic handpiece comprising:

a handle assembly defining a housing chamber, the handle assembly comprising:
a handle housing defining a handle chamber and a first seal recess,
a chuck assembly,
a bearing system for supporting the chuck assembly for rotation relative to the handle housing, the bearing system comprising
at least one bearing assembly defining a second seal recess, and
an O-ring arranged to be supported by the first seal recess and the second seal recess, and
a plurality of drive systems; and
a needle file defining
a support portion adapted to engage the chuck assembly,
a tool tip,
a working portion defining at least two sides configured to mechanically debride of the root canal,
a tool inlet located in the support portion,
a tool outlet adjacent to at least one of the two sides defined by the working portion, and
a tool passageway extending between the tool inlet and the tool outlet such that the tool inlet and the tool outlet are in fluid communication with the tool passageway; wherein the bearing assembly engages the chuck assembly and the chuck assembly engages the support portion of the needle file such that the O-ring, the bearing assembly, and the chuck assembly seal the handle chamber, the tool inlet is located within the sealed handle chamber, the plurality of drive systems are located outside of the sealed handle chamber and operatively connected to the chuck assembly such that movement of the plurality of drive systems is transferred to the chuck assembly, and movement of the chuck assembly is transferred to the needle file;

the endodontic handpiece is controllable such that the pressurized fluid flows through the tool inlet, the tool passageway, the tool outlet, and adjacent to the tool tip and each of the plurality of drive systems is controllable such that the endodontic handpiece operates in at least first, second, and third modes, where in the first mode, a first drive system of the plurality of drive systems is configured to rotate the chuck assembly, in the second mode, a second drive system of the plurality of drive systems is configured to vibrate the chuck assembly, and in the third mode the first drive system of the plurality of drive systems is configured to rotate the chuck assembly, and the second drive system of the plurality of drive systems is configured to vibrate the chuck assembly; and while the endodontic handpiece operates in at least one of any of the first, second, and third modes, the pressurized fluid performs fluid cleaning of the root canal and the working portion of the needle file mechanically debrides the root canal.

7. The endodontic handpiece as recited in claim 6, in which the working portion of the needle defines a cross-sectional shape having the at least two sides and further defining at least two edges.

8. The endodontic handpiece as recited in claim 7, in which, in cross-section, at least one of the at least two sides is flat, concave, or convex.

9. The endodontic handpiece as recited in claim 6, in which the working portion of the needle file defines a cross-sectional shape selected from the group of cross-sectional shapes consisting of triangular, square, rhomboidal, pentagonal, substantially triangular, and substantially square.

10. A method of performing an endodontic procedure comprising the steps of:

providing a handle assembly comprising:
a handle housing defining a handle chamber and a first seal recess,
a chuck assembly,
a bearing system for supporting the chuck assembly for rotation relative to the handle housing, the bearing system comprising at least one bearing assembly defining a second seal recess, and an O-ring arranged to be supported by the first seal recess and the second seal recess,
a first drive system for rotating the chuck assembly, and
a second drive system for imparting a vibratory force to the chuck assembly; and providing a needle file defining a support portion adapted to engage the chuck assembly,
a tip,
a working portion configured to mechanically debride of the root canal,
an inlet located in the support portion,
an outlet located adjacent to or at the tip, and
a passageway extending between the inlet and the outlet such that the inlet and the outlet are in fluid communication with the passageway;
forming an endodontic handpiece by engaging the bearing system with the chuck assembly and engaging the chuck assembly with the support portion of the needle file such that the O-ring, the bearing assembly, and the chuck assembly seal the handle chamber,
the inlet is located within the sealed handle chamber;
the first and second drive systems are located outside of the sealed handle chamber and operatively connected to the chuck assembly such that movement of the first and second drive systems
transferred to the chuck assembly, and movement of the chuck assembly is transferred to the needle file;
controlling the first and second drive systems to operate in at least first, second, and third modes such that the working portion of the needle file performs mechanical debridement of the root canal,
where in the first mode, the first drive system causes rotation of the needle file through the chuck assembly,
in the second mode, the second drive system causes vibration of the needle file, and
in the third mode the first drive system causes rotation of the needle file through the chuck assembly, and the second drive system causes vibration of the needle file; and causing pressurized fluid to flow through the sealed handle chamber, through the inlet, through the passageway, and out of the outlet to perform fluid cleaning of the root canal while the endodontic handpiece operates in at least one of any of the first, second, and third modes.

11. The method as recited in claim 10, in which the step causing pressurized fluid to flow adjacent to the tool tip comprises the step of introducing pressurized fluid to flow into the handle chamber such that pressurized fluid flows through the tool inlet, through the tool passageway, and out of the tool outlet such that pressurized fluid flows adjacent to the tool tip.

12. The method as recited in claim 10, in which the step of providing the needle file comprises the step of configuring the working portion of the needle file to define a cross-sectional shape defining at least two sides and at least two edges.

13. The method as recited in claim 12, in which the step of configuring the working portion of the needle file comprises the step of configuring the working portion such that, in cross-section, at least one of the at least two sides is flat, concave, or convex.

14. The method as recited in claim 10, in which the step of providing the needle file comprises the step of configuring the working portion of the needle file to define a cross-sectional shape defining the step of configuring the working portion of the needle file a cross-sectional shape selected from the group of cross-sectional shapes consisting of triangular, square, rhomboidal, pentagonal, substantially triangular, and substantially square.

* * * * *